United States Patent
Yang et al.

(10) Patent No.: US 9,151,976 B2
(45) Date of Patent: Oct. 6, 2015

(54) DISPLAY DEVICE AND METHOD OF MANUFACTURING THE SAME

(71) Applicant: Samsung Display Co., Ltd., Yongin, Gyeonggi-Do (KR)

(72) Inventors: Ji Seong Yang, Seoul (KR); Won Tae Kim, Suwon-si (KR); Kyung Tae Chae, Hwaseong-si (KR); Seok-Joon Hong, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 147 days.

(21) Appl. No.: 13/940,486

(22) Filed: Jul. 12, 2013

(65) Prior Publication Data

US 2014/0253855 A1 Sep. 11, 2014

(30) Foreign Application Priority Data

Mar. 6, 2013 (KR) .................. 10-2013-0024130

(51) Int. Cl.
| | | |
|---|---|---|
| *G02F 1/1333* | (2006.01) | |
| *G02F 1/1337* | (2006.01) | |
| *G02F 1/1341* | (2006.01) | |

(52) U.S. Cl.
CPC ........ *G02F 1/133377* (2013.01); *G02F 1/1341* (2013.01); *G02F 1/133707* (2013.01)

(58) Field of Classification Search
CPC .................................................. G02F 1/1333
USPC ..................................... 349/138, 187; 438/30
See application file for complete search history.

(56) References Cited

U.S. PATENT DOCUMENTS

| | | | | |
|---|---|---|---|---|
| 5,978,062 | A * | 11/1999 | Liang et al. ................... | 349/155 |
| 6,141,072 | A * | 10/2000 | Drabik et al. ................. | 349/122 |
| 7,961,273 | B2 * | 6/2011 | Moriya et al. ................... | 349/75 |
| 2007/0153180 | A1 * | 7/2007 | Lim et al. ....................... | 349/122 |
| 2011/0058133 | A1 * | 3/2011 | Ishigaki et al. ............... | 349/138 |
| 2011/0156995 | A1 * | 6/2011 | Choi et al. ..................... | 345/92 |
| 2012/0062448 | A1 * | 3/2012 | Kim et al. ....................... | 345/55 |
| 2012/0086881 | A1 * | 4/2012 | Kim et al. ....................... | 349/46 |
| 2012/0086895 | A1 * | 4/2012 | Lee et al. ....................... | 349/106 |
| 2012/0229724 | A1 * | 9/2012 | Miyairi et al. ................... | 349/43 |
| 2012/0281172 | A1 * | 11/2012 | Park et al. ...................... | 349/123 |
| 2013/0161604 | A1 * | 6/2013 | Huang et al. ................... | 257/43 |
| 2013/0250220 | A1 * | 9/2013 | Kim et al. ...................... | 349/123 |

(Continued)

FOREIGN PATENT DOCUMENTS

| | | |
|---|---|---|
| CN | 103424939 | 12/2013 |
| JP | 2013-242556 | 12/2013 |
| KR | 10-2013-0129008 | 11/2013 |

*Primary Examiner* — Sang V Nguyen
(74) *Attorney, Agent, or Firm* — Cantor Colburn LLP

(57) ABSTRACT

A display device includes a substrate, a thin film transistor disposed on the substrate, a pixel electrode connected to the thin film transistor, a common electrode disposed opposite to the pixel electrode and spaced apart from the pixel electrode, where a microcavity is defined between the common electrode and the pixel electrode, and a cutout is defined in the common electrode, an insulating layer disposed on the common electrode, a roof layer disposed on the insulating layer, where a liquid crystal injection hole is defined through the common electrode and the roof layer such that the common electrode and the roof layer expose a portion of the microcavity, a liquid crystal layer disposed in the microcavity, and an encapsulation layer disposed on the roof layer, where the encapsulation layer covers the liquid crystal injection hole, and seals the microcavity.

14 Claims, 30 Drawing Sheets

(56) References Cited

U.S. PATENT DOCUMENTS

| | | | |
|---|---|---|---|
| 2013/0308071 A1* | 11/2013 | Kim et al. | 349/43 |
| 2013/0321734 A1* | 12/2013 | Won et al. | 349/43 |
| 2013/0335664 A1* | 12/2013 | Shim et al. | 349/43 |

\* cited by examiner

DISPLAY DEVICE AND METHOD OF MANUFACTURING THE SAME

This application claims priority to Korean Patent Application No. 10-2013-0024130 filed on Mar. 6, 2013, and all the benefits accruing therefrom under 35 U.S.C. §119, the content of which in its entirety is herein incorporated by reference.

BACKGROUND (a) Field

The invention relates to a display device and a method of manufacturing the display device, and more particularly, to a display device in which a cutout is formed in a common electrode of the display device using one substrate, and a method of manufacturing the display device.

(b) Description of the Related Art

A liquid crystal display, which is one of the most widely used types of a flat panel display, typically includes two display panels, on which field generating electrodes such as a pixel electrode and a common electrode are disposed and a liquid crystal layer is interposed therebetween, and displays an image by applying a voltage to a field generating electrode to generate an electric field on the liquid crystal layer, determine alignment of liquid crystal molecules of the liquid crystal layer therethrough, and control polarization of incident light.

The two display panels of the liquid crystal display may be a thin film transistor array panel and a counter display panel, respectively. In the thin film transistor array panel, a gate line for transferring a gate signal and a data line for transferring a data signal are provided crossing each other, and a thin film transistor connected to the gate line and the data line, a pixel electrode connected to the thin film transistor, and the like may be disposed therein. A light blocking member, a color filter, a common electrode, and the like may be disposed in the counter display panel. Alternatively, the light blocking member, the color filter and the common electrode may be disposed in the thin film transistor array panel.

However, in a conventional liquid crystal display, where two substrates are used and constituent elements are provided on the two substrates.

SUMMARY

Exemplary embodiments of the invention relate to a display device with reduced weight and thickness, and a method of manufacturing the display device with reduced manufacturing cost and time by manufacturing the display device using one substrate.

Exemplary embodiments of the invention relate to a display device using a substrate, in which a cutout is formed in a common electrode, and a method of manufacturing the display device.

An exemplary embodiment of a display device includes a substrate, a thin film transistor disposed on the substrate, a pixel electrode connected to the thin film transistor, a common electrode disposed opposite to the pixel electrode and spaced apart from the pixel electrode, where a microcavity is defined between the common electrode and the pixel electrode, and a cutout is defined in the common electrode, an insulating layer disposed on the common electrode, a roof layer disposed on the insulating layer, where a liquid crystal injection hole is defined through the common electrode and the roof layer such that the common electrode and the roof layer expose a portion of the microcavity, a liquid crystal layer disposed in the microcavity, and an encapsulation layer disposed on the roof layer, where the encapsulation layer covers the liquid crystal injection hole, and seals the microcavity.

In an exemplary embodiment, the insulating layer may have an irregular thickness.

In an exemplary embodiment, a thickness of a portion of the insulating layer positioned on the cutout of the common electrode is less than a thickness of a remaining portion of the insulating layer.

In an exemplary embodiment, the insulating layer may include a lower insulating layer disposed on the common electrode, and an upper insulating layer disposed on the lower insulating layer.

In an exemplary embodiment, the lower insulating layer may be disposed on a portion of the common electrode and expose the cutout of the common electrode.

In an exemplary embodiment, the upper insulating layer may be disposed on the lower insulating layer and the cutout of the common electrode.

In an exemplary embodiment, the lower insulating layer and the upper insulating layer may include a same material as each other.

In an exemplary embodiment, the insulating layer may include silicon nitride or silicon oxide.

In an exemplary embodiment, the display device may further include a gate line disposed on the substrate, and a data line disposed on the substrate crossing the gate line, where a plurality of pixel regions are defined on the substrate, a pixel region of the pixel regions may include a first sub-pixel region and a second sub-pixel region spaced apart from each other with the gate line interposed therebetween, the pixel electrode may include a first sub-pixel electrode disposed in the first sub-pixel region and a second sub-pixel electrode disposed in the second sub-pixel region, and the common electrode and the roof layer may cover a lateral surface of the microcavity at opposing edges of the pixel region.

In an exemplary embodiment, the common electrode and the roof layer may cover the lateral surface of the microcavity at an edge of the pixel region which is substantially parallel to the data line, and the liquid crystal injection hole may be defined between the first sub-pixel region and the second sub-pixel region.

Another exemplary embodiment of a method of manufacturing a display device, includes: providing a thin film transistor on a substrate, providing a pixel electrode connected to the thin film transistor, providing a sacrificial layer on the pixel electrode; providing a common electrode on the sacrificial layer, providing and patterning a lower insulating layer on the common electrode, patterning the common electrode using the patterned lower insulating layer as a mask to form a cutout of the common electrode, providing a roof layer on the lower insulating layer, patterning the roof layer to expose a portion of the sacrificial layer, thus providing a liquid crystal injection hole, removing the sacrificial layer to form a microcavity between the pixel electrode and the common electrode, injecting a liquid crystal material through the liquid crystal injection hole into the microcavity to provide a liquid crystal layer, and providing an encapsulation layer on the roof layer to seal the microcavity.

In an exemplary embodiment, the method of manufacturing a display device may further include: providing an upper insulating layer on the patterned lower insulating layer after patterning the common electrode, in which the upper insulating layer is provided between the roof layer and the lower insulating layer.

In an exemplary embodiment, the providing and patterning the lower insulating layer may include providing the lower insulating layer on the common electrode, applying a photosensitive film on the lower insulating layer, exposing and developing the photosensitive film to form a photosensitive film pattern, patterning the lower insulating layer using the photosensitive film pattern, and removing the photosensitive film pattern.

In an exemplary embodiment, the patterning the common electrode may be performed after the removing the photosensitive film pattern.

In an exemplary embodiment, the removing the photosensitive film pattern may include using a stripper.

In an exemplary embodiment, the lower insulating layer may be provided on a portion of the common electrode and expose the cutout of the common electrode.

In an exemplary embodiment, the upper insulating layer may be provided on the lower insulating layer and the cutout of the common electrode.

In an exemplary embodiment, the lower insulating layer and the upper insulating layer may include a same material as each other.

In an exemplary embodiment, the lower insulating layer and the upper insulating layer may include silicon nitride or silicon oxide.

In an exemplary embodiment, a plurality of pixel regions is defined on the substrate, and the common electrode and the roof layer may cover a lateral surface of the microcavity at opposing edges of a pixel region of the pixel regions.

In exemplary embodiments of the invention, the display device include one substrate, and the method of manufacturing the display device using the one substrate such that weight, thickness, cost and a process time by manufacturing the display device are substantially reduced. In such embodiments, damage of a sacrificial layer is effectively prevented by providing a lower insulating layer on a common electrode, patterning the lower insulating layer, and patterning the common electrode using the patterned lower insulating layer as a mask.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION OF THE EMBODIMENTS

Figure 1:
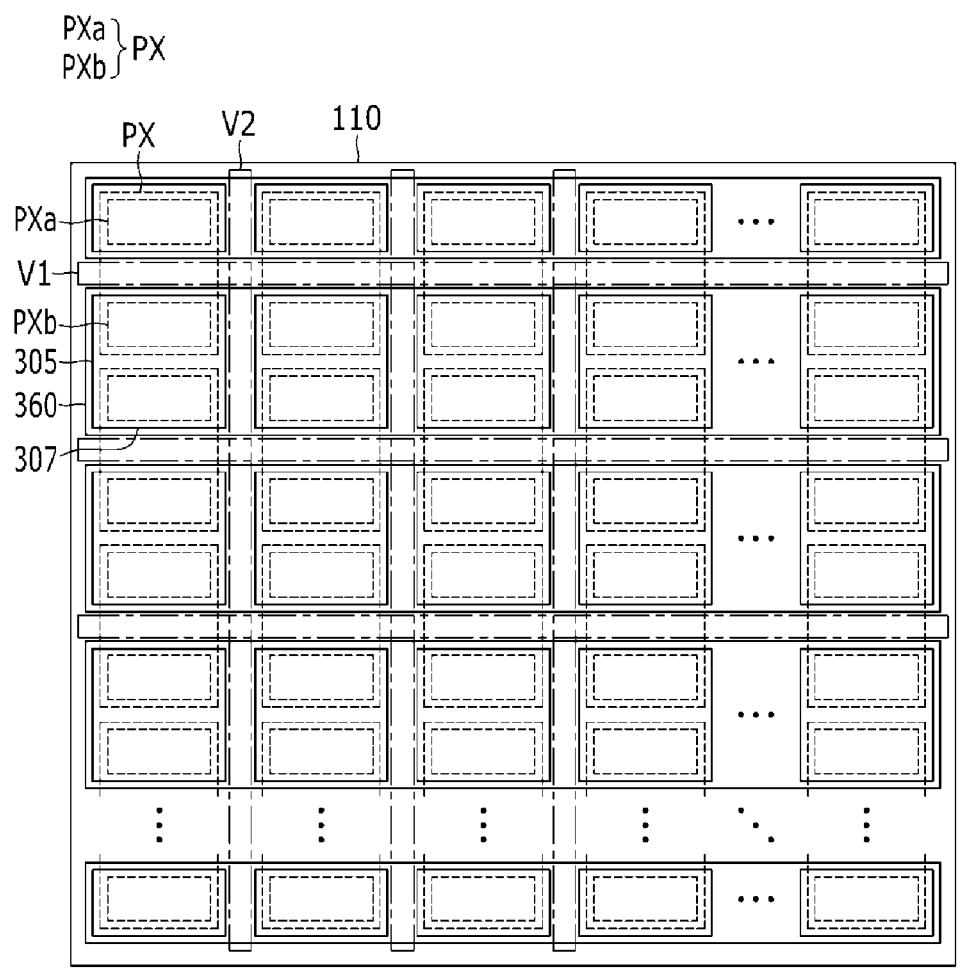
FIG. 1 is a top plan view of an exemplary embodiment of a display device according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

First, an exemplary embodiment of a display device according to the invention will be described with reference to FIG. 1.

FIG. 1 is a top plan view of an exemplary embodiment of a display device according to the invention.

An exemplary embodiment of the display device according to the invention includes a substrate 110 including a material such as glass or plastic, for example.

The substrate 110 includes a plurality of pixel regions PX disposed thereon. A plurality of pixel regions PX is arranged substantially in a matrix form including a plurality of pixel rows and a plurality of pixel columns. Each pixel region PX may include a first sub-pixel region PXa and a second sub-pixel region PXb. The first sub-pixel region PXa and the second sub-pixel region PXb may be disposed adjacent to each other in a column direction.

A microcavity 305 covered by a roof layer 360 is defined on the substrate 110. In an exemplary embodiment, as shown in FIG. 1, the roof layer 360 extends in a row direction, and the roof layer 360 may cover a plurality of microcavities 305 arranged in the row direction.

A first valley V1 is positioned in a pixel row direction between the first sub-pixel region PXa and the second sub-pixel region PXb, and a second valley V2 is positioned between adjacent pixel columns.

A plurality of roof layers 360 may be separated from each other with the first valley V1 interposed therebetween. In an exemplary embodiment, a portion of the microcavity 305 adjacent to the first valley V1 may be exposed to an outside. The exposed portion of the microcavity 305 may be referred to as a liquid crystal injection hole 307.

In an exemplary embodiment, each roof layer 360 is spaced apart from the substrate 110 between the adjacent second valleys V2, thus defining the microcavity 305. In such an embodiment, each roof layer 360 may be attached to the substrate 110 in the second valley V2, thus covering both lateral surfaces of the microcavity 305.

The structure of an exemplary embodiment the display device according to the invention is not limited to the structure described above. In one alternative exemplary embodiment, for example, a position of the pixel region PX, the first valley V1 and the second valley V2 may be different, a plurality of roof layers 360 may be connected to each other in the first valley V1, and a portion of each roof layer 360 may be spaced apart from the substrate 110 in the second valley V2 to connect the adjacent microcavities 305 to each other.

Now, a pixel of an exemplary embodiment of the display device according to the invention will hereinafter be described with reference to FIGS. 2 and 3.

Figure 2:
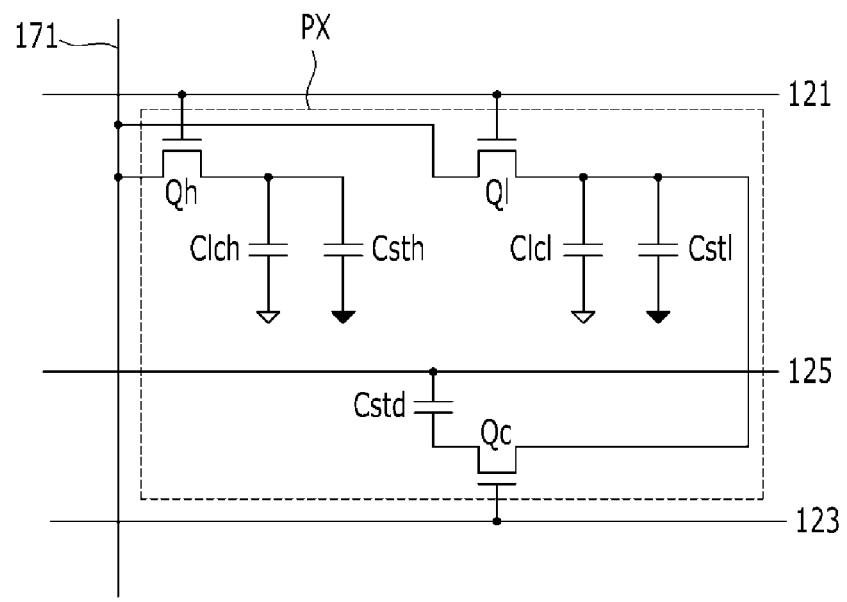
FIG. 2 is an equivalent circuit diagram showing a pixel of an exemplary embodiment of the display device according to the invention.
Figure 3:
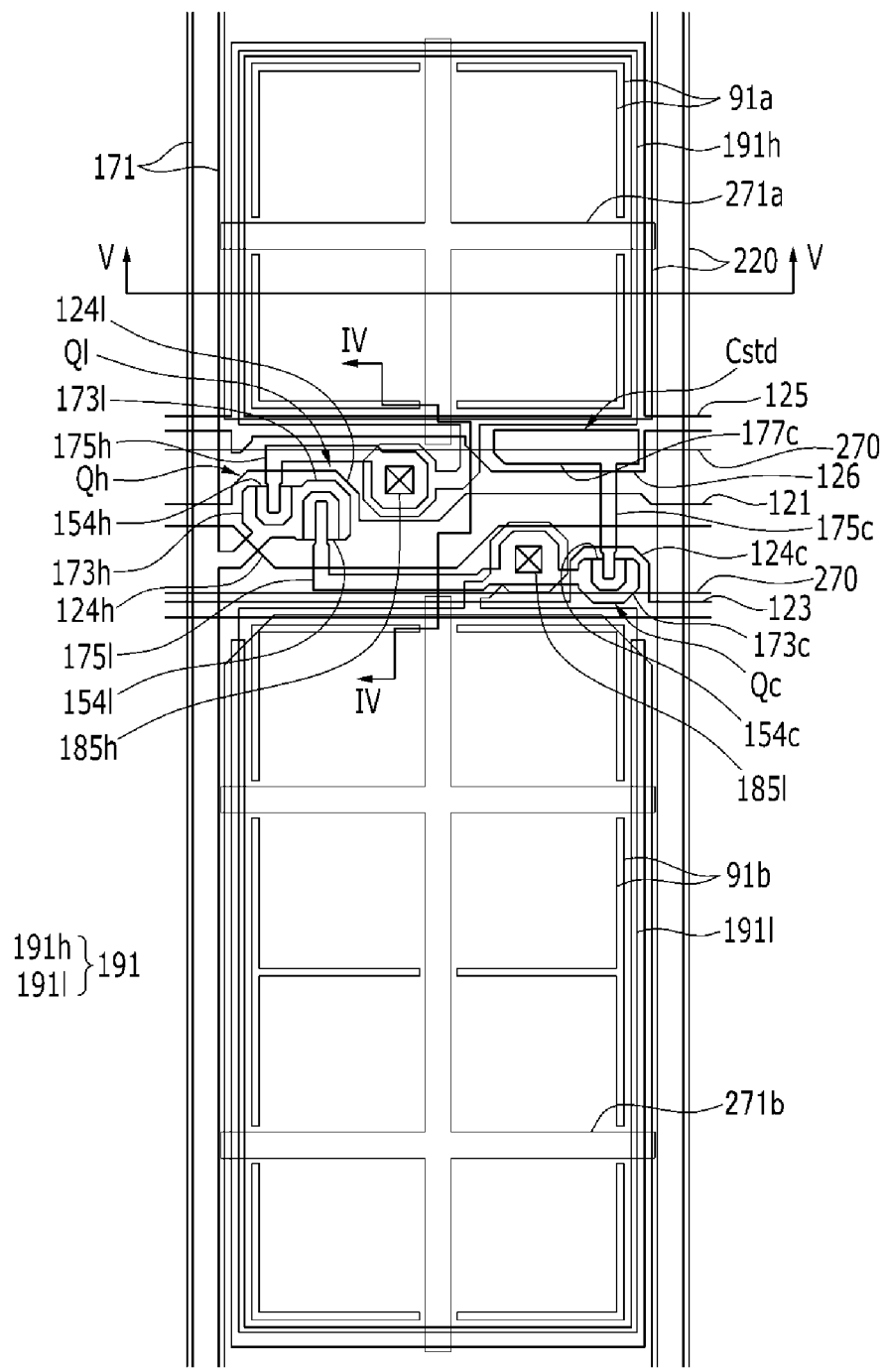
FIG. 3 is a top plan view of a pixel of an exemplary embodiment of the display device according to the invention.

FIG. 2 is an equivalent circuit diagram showing a pixel of an exemplary embodiment of the display device according to the invention, and FIG. 3 is a top plan view illustrating a pixel of an exemplary embodiment of the display device according to the invention.

An exemplary embodiment of the display device according to the invention includes signal lines such as a gate line 121, a storage electrode line 125, a voltage drop gate line 123 and a data line 171.

In a pixel of such an embodiment, a first switching element Qh, a second switching element Ql, a third switching element Qc, a first liquid crystal capacitor Clch, a second liquid crystal capacitor Clcl, a first storage capacitor Csth, a second storage capacitor Cstl, a voltage drop capacitor Cstd, and the like are connected to the signal lines. Hereinafter, an exemplary embodiment where the first switching element Qh is a first thin film transistor Qh, the second switching element Ql is a second thin film transistor Ql, and the third switching element Qc is a third thin film transistor Qc will be described.

In an exemplary embodiment, as shown in FIG. 2, each of the first and second switching elements Qh and Ql are connected to the gate line 121 and the data line 171, and the third switching element Qc is connected to the voltage drop gate line 123.

The first and second switching elements Qh and Ql are a three terminal element such as a thin film transistor disposed on the substrate 110, a control terminal of each of the first and second switching elements Qh and Ql is connected to the gate line 121, an input terminal of each of the first and second switching elements Qh and Ql is connected to the data line 171, and output terminals of the first and second switching elements Qh and Ql are connected to the first and second liquid crystal capacitors Clch and Clcl, respectively, and the first and second storage capacitors Csth and Cstl, respectively.

The third switching element Qc is a three terminal element such as a thin film transistor disposed on the substrate 110, a control terminal of the third switching element Qc is connected to the voltage drop gate line 123, an input terminal of the third switching element Qc is connected to the second liquid crystal capacitor Clcl, and an output terminal of the third switching element Qc is connected to the voltage drop capacitor Cstd.

In an exemplary embodiment, the first and second liquid crystal capacitors Clch and Clcl are defined by overlapping first and second subpixel electrodes 191h and 191l, which are connected to the first and second switching elements Qh and Ql, respectively, and a common electrode 270. The first and second sub-pixel electrodes 191h and 191l are disposed under the microcavity 305, and the common electrode 270 is disposed on the microcavity 305. The first and second storage capacitors Csth and Cstl are defined by overlapping the storage electrode line 125 and the first and second sub-pixel electrodes 191h and 191l.

The voltage drop capacitor Cstd is connected to the output terminal of the third switching element Qc and the storage electrode line 125, and is defined by overlapping the storage electrode line 125 and the output terminal of the third switching element Qc with an insulator interposed therebetween.

Then, an exemplary embodiment of a method of driving the display device illustrated in FIGS. 2 and 3 will be described.

When a gate-on signal is applied to the gate line 121, the first switching element Qh and the second switching element Ql connected to the gate line 121 are turned on. Accordingly, the data voltage applied to the data line 171 is applied to the first sub-pixel electrode 191h and the second sub-pixel electrode 191l through the turned-on first switching element Qh and second switching element Ql. In an exemplary embodiment, voltage levels of the data voltages applied to the first sub-pixel electrode 191h and the second sub-pixel electrode 191l are substantially the same as each other. Therefore, the voltages charged in the first and second liquid crystal capacitors Clch and Clcl are substantially the same as each other.

Thereafter, when a gate-off signal is applied to the gate line 121 and the gate-on signal is applied to the voltage drop gate line 123, the first switching element Qh and the second switching element Ql are turned off, and the third switching element Qc is turned on. Then, electric charges move from the second sub-pixel electrode 191l through the third switching element Qc to the voltage drop capacitor Cstd. Then, the charge voltage of the second liquid crystal capacitor Clcl is lowered, and the voltage drop capacitor Cstd is charged. Since the charge voltage of the second liquid crystal capacitor Clcl is lowered by the capacitance of the voltage drop capacitor Cstd, the charge voltage of the second liquid crystal capacitor Clcl becomes lower than the charge voltage of the first liquid crystal capacitor Clch.

In such an embodiment, the charge voltages of the two liquid crystal capacitors Clch and Clcl show different gamma curves, and the gamma curve of a pixel voltage becomes a curve obtained by synthesizing the different gamma curves. The synthetic gamma curve at a front surface is set to be substantially identical to the reference gamma curve at the front surface, which is predetermined to be most suitable, and the synthetic gamma curve at a lateral surface is set to be the closest to the reference gamma curve at the front surface. The lateral surface visibility may be substantially improved by changing the image data as described above.

Subsequently, an exemplary embodiment of the display device according to the invention will be further described with reference to FIGS. 3 to 5.

Figure 4:
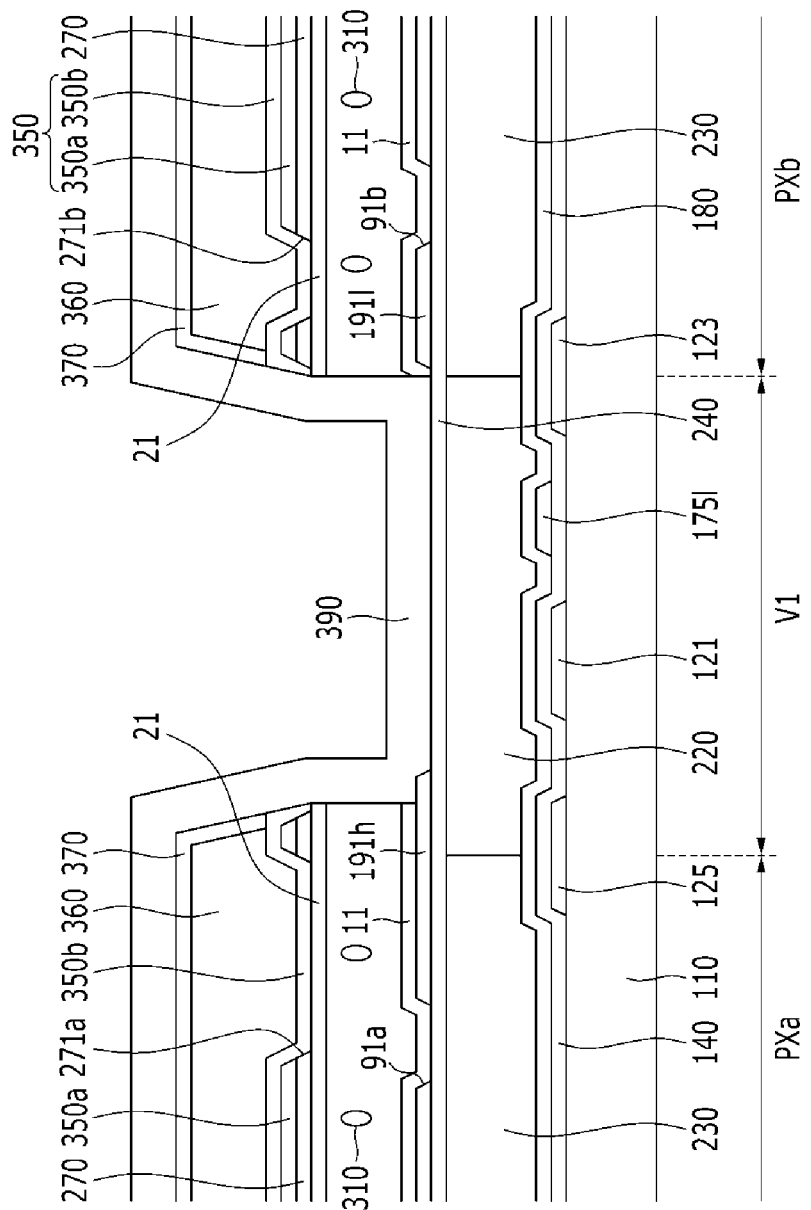
FIG. 4 is a cross-sectional view taken along line IV-IV of FIG. 3, showing a pixel of an exemplary embodiment of the display device according to the invention.
Figure 5:
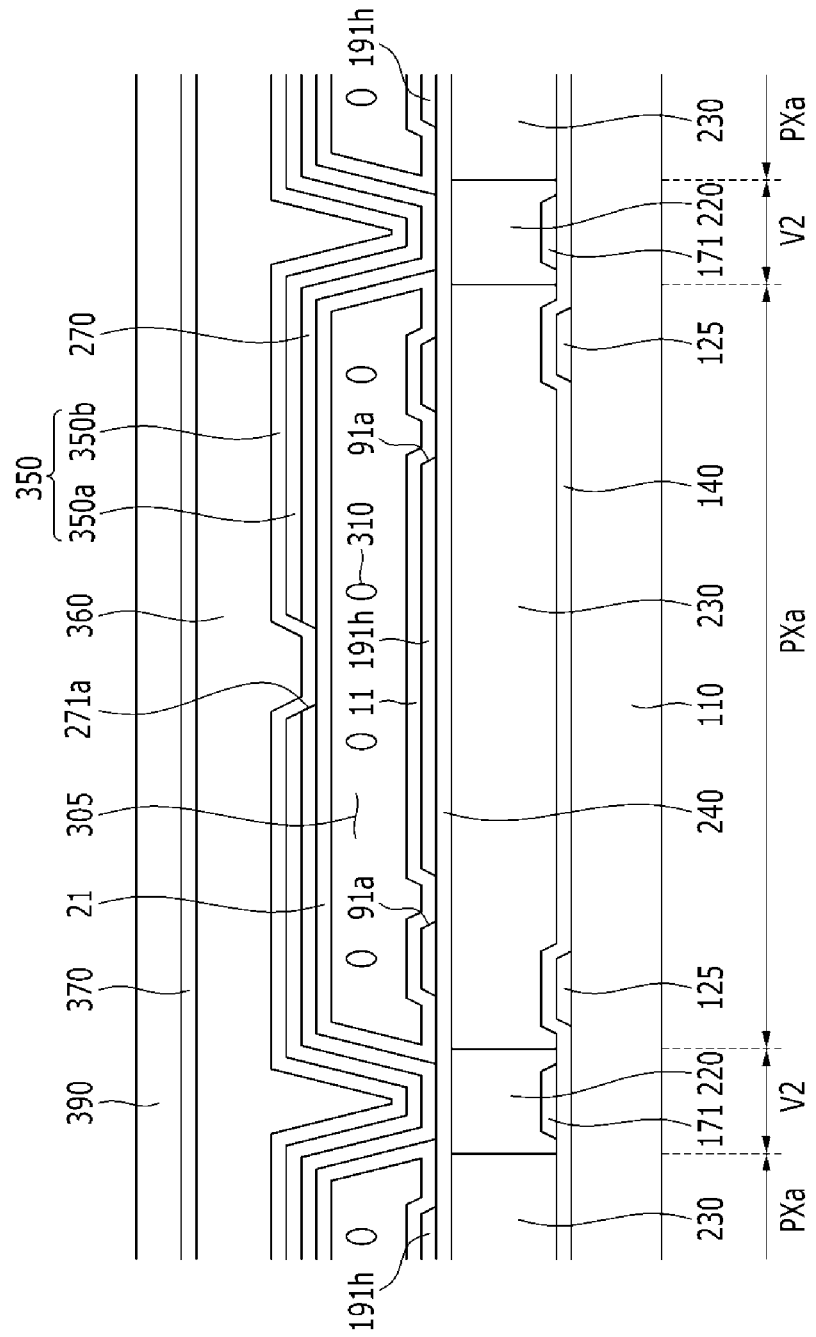
FIG. 5 is a cross-sectional view taken along line V-V of FIG. 3, showing a pixel of an exemplary embodiment of the display device according to the invention.

FIG. 4 is a cross-sectional view taken along line IV-IV of FIG. 3, illustrating a pixel of an exemplary embodiment of the display device according to the invention, and FIG. 5 is a cross-sectional view taken along line V-V of FIG. 3, illustrating a pixel of an exemplary embodiment of the display device according to the invention.

As illustrated in FIGS. 3 to 5, an exemplary embodiment of the display device according to the invention includes gate conductors including the gate line 121, the voltage drop gate line 123, the storage electrode line 125, and the like, which are disposed on the substrate 110 (also referred to as an "insulating substrate").

The gate line 121 and the voltage drop gate line 123 extend substantially in a horizontal direction and transfer a gate signal. The gate line 121 includes a first gate electrode 124h and a second gate electrode 124l that protrude upward and downward from an extending direction thereof, and the voltage drop gate line 123 includes a third gate electrode 124c that protrudes upward from an extending direction thereof. The first gate electrode 124h and the second gate electrode 124l are connected to each other and collectively define a protrusion portion. In an alternative exemplary embodiment, the protrusion forms of the first, second and third gate electrodes 124h, 124l and 124c may be different.

The storage electrode line 125 extends substantially in a horizontal direction and transfers a predetermined voltage such as a common voltage. The storage electrode line 125 protrudes upward and downward from an extending direction thereof to surround an edge of the pixel region, e.g., a capacitance electrode 126 protruding downward from an extending direction thereof.

A gate insulating layer 140 is disposed on the gate conductors 121, 123 and 125. The gate insulating layer 140 may include an inorganic insulating material such as silicon nitride (SiNx) and silicon oxide (SiOx), for example. In an exemplary embodiment, the gate insulating layer 140 may have a single layer structure or a multilayer structure.

A first semiconductor 154h, a second semiconductor 154l and a third semiconductor 154c are disposed on the gate insulating layer 140. The first semiconductor 154h may be disposed on the first gate electrode 124h, the second semiconductor 154l may be disposed on the second gate electrode 124l, and the third semiconductor 154c may be disposed on the third gate electrode 124c. The first semiconductor 154h and the second semiconductor 154l may be connected to each other, and the second semiconductor 154l and the third semiconductor 154c may be connected to each other. In an exemplary embodiment, the first semiconductor 154h may extend below the data line 171. The first to third semiconductors 154h, 154l and 154c may include amorphous silicon, polycrystalline silicon, metal oxide, or the like, for example.

Ohmic contacts (not illustrated) may be further disposed on each of the first to third semiconductors 154h, 154l and 154c.

Data conductors including a data line 171, a first source electrode 173h, a second source electrode 173l, a third source electrode 173c, a first drain electrode 175h, a second drain electrode 175l, and a third drain electrode 175c are disposed on the first to third semiconductors 154h, 154l and 154c.

The data line 171 transfers a data signal, and extends substantially in a vertical direction crossing the gate line 121 and the voltage drop gate line 123.

The first source electrode 173h protrudes from the data line 171 and is disposed on the first gate electrode 124h, and the second source electrode 173l is disposed on the second gate electrode 124l. The first source electrode 173h and the second source electrode 173l are connected to each other, and receive substantially the same data signal from the data line 171.

Each of the first drain electrode 175h, the second drain electrode 175l and the third drain electrode 175c include a wide end portion and a rod-shaped end portion. The rod-shaped end portions of the first drain electrode 175h and the second drain electrode 175l are partially surrounded by the first source electrode 173h and the second source electrode 173l. The wide end portion of the second drain electrode 175l further extends to a third source electrode 173c that is bent to have a U-shape. The wide end portion 177c of the third drain electrode 175c overlaps the capacitance electrode 126 to define a voltage drop capacitor Cstd, and the rod-shaped end portion is partially surrounded by the third source electrode 173c.

The first, second and third gate electrodes 124h, 124l and 124c, the first, second and third source electrodes 173h, 173l and 173c, the first, second and third drain electrodes 175h, 175l and 175c, and the first, second and third semiconductors 154h, 154l and 154c defines first, second and third thin film transistors Qh, Ql, and Qc, respectively, and a channel of the thin film transistor is formed in each of the semiconductors 154h, 154l or 154c between corresponding source electrode 173h, 173l or 173c and corresponding drain electrode 175h, 175l or 175c.

A passivation layer 180 is disposed on the data conductors 171, 173h, 173l, 173c, 175h, 175l and 175c, and the semiconductors 154h, 154l and 154c exposed between the source electrodes 173h, 173l and 173c and the drain electrodes 175h, 175l and 175c. The passivation layer 180 may include an organic insulating material or an inorganic insulating material, and have a single layer structure or a multilayer structure.

A color filter 230 is disposed in each pixel region PX on the passivation layer 180. Each color filter 230 may display one of primary colors such as three primary colors of red, green and blue colors, for example, but not being limited thereto. In an alternative exemplary embodiment, the color filter 230 may display cyan, magenta, yellow and white-based colors. In an exemplary embodiment, as shown in FIGS. 3 to 5, the color filter 230 may extend substantially in a row direction. In an alternative exemplary embodiment, the color filter 230 may extend substantially in a column direction along a portion between the adjacent data lines 171.

A light blocking member 220 is disposed in a region between the adjacent color filters 230. The light blocking member 220 may be disposed on a boundary portion of a pixel regions PX and the thin film transistor to effectively prevent light leakage. In an exemplary embodiment, the light blocking member 220 may be disposed in a first valley V1 and a second valley V2. The color filter 230 and the light blocking member 220 may overlap each other in some regions.

A first insulating layer 240 may be disposed on the color filter 230 and the light blocking member 220. The first insulating layer 240 may include an inorganic insulating material such as silicon nitride (SiNx) and silicon oxide (SiOx), for example. In such an embodiment, the first insulating layer 240 protects the color filter 230 and the light blocking member 220 including the organic material. In an alternative exemplary embodiment, the first insulating layer 240 may be omitted.

A first contact hole 185h and a second contact hole 185l, through which the wide end portion of the first drain electrode 175h and the wide end portion of the second drain electrode 175l are exposed, are formed through the first insulating layer 240, the light blocking member 220 and the passivation layer 180.

A pixel electrode 191 is disposed on the first insulating layer 240. The pixel electrode 191 includes cutouts 91a and 91b which are adjacent to at least a portion of edges of the pixel electrode 191 and formed along the edge. The arrangement of the liquid crystal molecules may be controlled based on the cutouts 91a and 91b along the edge of the pixel electrode 191 by generating a fringe field at the edge of the pixel region. The pixel electrode 191 may include a transparent metal material such as indium tin oxide ("ITO") and indium zinc oxide ("IZO"), for example.

The pixel electrode 191 includes a first sub-pixel electrode 191h and a second sub-pixel electrode 191l, which are spaced apart from each other with the gate line 121 and the voltage drop gate line 123 interposed therebetween, and disposed in an upper portion and a lower portion of the pixel region PX with respect to the gate line 121 and the voltage drop gate line 123 to be adjacent to each other in a column direction. In such an embodiment, the first sub-pixel electrode 191h and the second sub-pixel electrode 191l are spaced apart from each other with the first valley V1 interposed therebetween, the first sub-pixel electrode 191h is positioned in the first sub-pixel region PXa, and the second sub-pixel electrode 191l is positioned in the second sub-pixel region PXb.

The first sub-pixel electrode 191h and the second sub-pixel electrode 191l are connected to the first drain electrode 175h and the second drain electrode 175l, respectively, through the first contact hole 185h and the second contact hole 185l. Accordingly, when the first thin film transistor Qh and the second thin film transistor Ql are turned on, a data voltage is received from the first drain electrode 175h and the second drain electrode 175l.

In the above, the shape of the pixel electrode 191 of an exemplary embodiment illustrated in FIG. 2 is described, but is not limited thereto, and may be variously modified.

A common electrode 270 is disposed on the pixel electrode 191 to be spaced apart from the pixel electrode 191 by a predetermined distance. A microcavity 305 is defined between the pixel electrode 191 and the common electrode 270. A width and an area of the microcavity 305 may be variously modified based on a resolution of the display device.

The common electrode 270 may include a transparent metal material such as ITO and IZO, for example. A predetermined voltage may be applied to the common electrode 270, and an electric field may be generated between the pixel electrode 191 and the common electrode 270.

The common electrode 270 includes cutouts 271a and 271b, e.g., a first cutout 271a formed in the first sub-pixel region PXa and a second cutout 271b formed in the second sub-pixel region PXb. The first cutout 271a is disposed to overlap the first sub-pixel electrode 191h, and the second cutout 271b is disposed to overlap the second sub-pixel electrode 191l.

In an exemplary embodiment, the first cutout 271a and the second cutout 271b may have a cross shape, and ends of the first cutout 271a and the second cutout 271b protrude farther than edges of the first sub-pixel electrode 191h and the second sub-pixel electrode 191l, respectively, when viewed from a top view. In such an embodiment, an effect of the fringe field is stably applied up to the edge of the pixel region by forming the edge of the cutout of the common electrode 270 to protrude farther than the edge of the pixel electrode, such that the arrangement of the liquid crystal molecules may be effectively controlled in a predetermined direction at the edge of the pixel region.

In an exemplary embodiment, widths of the first cutout 271a and the second cutout 271b be less than or equal to about three times the height of the microcavity 305, that is, a cell-gap.

The first sub-pixel electrode 191h and the second sub-pixel electrode 191l may be divided into a plurality of sub-regions by the first cutout 271a, the second cutout 271b and the edges of the first sub-pixel electrode 191h and the second sub-pixel electrode 191l.

A liquid crystal layer including liquid crystal molecules 310 is disposed in the microcavity 305 positioned between the pixel electrode 191 and the common electrode 270. In an exemplary embodiment, the liquid crystal molecules 310 have negative dielectric anisotropy, and may be aligned substantially in a vertical direction on the substrate 110 in a state where the electric field is not applied, such that vertical alignment may be performed.

A first alignment layer 11 is disposed on the pixel electrode 191. The first alignment layer 11 may be disposed on a portion of the first insulating layer 240 exposed by the pixel electrode 191.

A second alignment layer 21 is disposed under the common electrode 270 to face the first alignment layer 11.

The first alignment layer 11 and the second alignment layer 21 may include a vertical alignment layer, and may include a material such as polyamic acid, polysiloxane and polyimide, for example. The first and second alignment layers 11 and 21 may be connected to each other at an edge of the pixel region PX.

The first sub-pixel electrode 191h and the second sub-pixel electrode 191l, to which the data voltage is applied, generate an electric field together with the common electrode 270 to determine a direction of the liquid crystal molecules 310 positioned in the microcavity 305 between the pixel and common electrodes 191 and 270. Luminance of light passing through the liquid crystal layer is changed based on the direction of the liquid crystal molecules 310 controlled by the electric filed.

The first sub-pixel electrode 191h, the common electrode 270 and the liquid crystal layer interposed therebetween form the first liquid crystal capacitor Clch, and the second sub-pixel electrode 191l, the common electrode 270 and the liquid crystal layer interposed therebetween form the second liquid crystal capacitor Clcl to maintain the applied voltage after the first and second thin film transistors Qh and Ql are turned off.

The first and second sub-pixel electrodes 191h and 191l overlap the storage electrode line 125 to form the first and second storage capacitors Csth and Cstl, respectively, and the first and second storage capacitors Csth and Cstl increase the voltage storage ability of the first and second liquid crystal capacitors Clch and Clcl.

The capacitance electrode 126 and the wide end portion 177c of the third drain electrode 175c overlap each other with the gate insulating layer 140 interposed therebetween to form a voltage drop capacitor Cstd.

In an exemplary embodiment, as described above, the first sub-pixel electrode 191h and the second sub-pixel electrode 191l, to which the data voltage is applied, generate an electric field together with the common electrode 270, such that the liquid crystal molecules 310 of the liquid crystal layer, which are aligned substantially vertically to the surfaces of the pixel and common electrodes 191 and 270 when electric field is not generated in the liquid crystal layer, lie in a horizontal direction to the surfaces of the pixel and common electrodes 191 and 270, and luminance of light passing through the liquid crystal layer is changed based on the alignment of the liquid crystal molecules 310.

The liquid crystal layer includes the liquid crystal molecules 310 having negative dielectric anisotropy and a polymer. Longitudinal axes of the liquid crystal molecules 310 are aligned to have a pretilt by the polymer to be substantially parallel to a direction from four portions, at which the edges of the sub-pixel electrodes 191h and 191l extending in different directions meet toward the center portion of the cutouts 271a and 271b of the common electrode 270 having the cross shape, and are substantially vertical to the surface of the substrate 110, by the cutouts 271a and 271b of the common electrode and the edges of the sub-pixel electrodes 191h and 191l. Accordingly, each of the first and second sub-pixels has four sub-regions having different pretilt directions of liquid crystal molecules 310.

The microcavity 305 is surrounded by the pixel electrode 191 and the common electrode 270.

In an exemplary embodiment, the common electrode 270 may be in contact with the first insulating layer 240 on the second valley V2, such that the common electrode 270 covers the left surface and the right surface of the microcavity 305. In such an embodiment, the common electrodes 270 are connected along the pixel rows, and the microcavity 305 is not formed under the common electrode 270 positioned in the second valley V2 such that the height of the common electrode 270 positioned in the second valley V2 is less than or equal to the height of the common electrode positioned in the pixel region PX.

In an exemplary embodiment, the common electrode 270 is not overlapping at least some regions of the first valley V1. In such an embodiment, the common electrode 270 does not cover at least a portion of the upper surface and the lower surface of the pixel region PX, such that a portion of the microcavity 305 is exposed to the outside. The surface, at which the microcavity 305 is exposed, is referred to as a liquid crystal injection hole 307. The liquid crystal injection hole 307 is formed along the first valley V1, and the liquid crystal material is injected through the liquid crystal injection hole 307 into the microcavity 305.

In an exemplary embodiment, as described above, the common electrode 270 covers the left surface and the right surface of the microcavity 305 and does not cover at least a portion of the upper surface and the lower surface, but the invention is not limited thereto. In an alternative exemplary embodiment, and the common electrode 270 may be formed to cover another lateral surface of the microcavity 305. In one exemplary embodiment, for example, the common electrode 270 may cover the upper surface and the lower surface of the microcavity 305 and expose at least a portion of the left surface and the right surface. In such an embodiment, the liquid crystal injection hole 307 may be formed along the second valley V2.

In an exemplary embodiment, a second insulating layer 350 is disposed on the common electrode 270. The second insulating layer 350 includes a second lower insulating layer 350a disposed on the common electrode 270 and a second upper insulating layer 350b disposed on the second lower insulating layer 350a.

The second lower insulating layer 350a may have substantially the same pattern as the common electrode 270 disposed therebelow. The second lower insulating layer 350a is disposed on the common electrode 270, and exposes the cutouts 271a and 271b of the common electrode 270. In such an embodiment, the second lower insulating layer 350a may be disposed on a portion of the common electrode 270 other than the cutouts 271a and 271b.

The second upper insulating layer 350b may be disposed on the second lower insulating layer 350a, and have a pattern that is different from the pattern of the second lower insulating layer 350a. The second upper insulating layer 350b is disposed on the common electrode 270 and on the cutouts 271a and 271b. In such an embodiment, the second upper insulating layer 350b is disposed on a portion of the common electrode 270 including the cutouts 271a and 271b.

The second insulating layer 350 may have an irregular thickness. In an exemplary embodiment, where each of the second lower insulating layer 350a and the second upper insulating layer 350b has a substantially regular thickness, the thickness of the second insulating layer 350 may not be regular as the patterns of the second lower insulating layer 350*a* and the second upper insulating layer 350*b* are different from each other. In an exemplary embodiment, the second lower insulating layer 350*a* is not disposed on the cutouts 271*a* and 271*b* and the second insulating layer 350 is disposed on the cutouts 271*a* and 271*b* such that the thickness of a portion of the second insulating layer 350 positioned on the cutouts 271*a* and 271*b* is less than or equal to the thickness of other portions of the second insulating layer 350.

The second lower insulating layer 350*a* and the second upper insulating layer 350*b* may include substantially the same material as each other. In one exemplary embodiment, for example, the second lower insulating layer 350*a* and the second upper insulating layer 350*b* may include an inorganic insulating material such as silicon nitride (SiNx) and silicon oxide (SiOx).

In an alternative exemplary embodiment, the second lower insulating layer 350*a* and the second upper insulating layer 350*b* may include different materials. In one exemplary embodiment, for example, the second lower insulating layer 350*a* may include silicon nitride and the second upper insulating layer 350*b* may include silicon oxide, and vice versa.

In an exemplary embodiment, a roof layer 360 is disposed on the second insulating layer 350. The roof layer 360 may include an organic material. The microcavity 305 is formed under the roof layer 360, and the shape of the microcavity 305 may be maintained by the roof layer 360.

The roof layers 360 are connected along the pixel rows like the common electrode 270, and the liquid crystal injection hole 307 is formed along the first valley V1 in the roof layer 360 to expose a portion of the microcavity 305 to the outside.

A third insulating layer 370 may be disposed on the roof layer 360. The third insulating layer 370 may include an inorganic insulating material such as silicon nitride (SiNx) and silicon oxide (SiOx), for example. The third insulating layer 370 may cover an upper surface and a lateral surface of the roof layer 360. The third insulating layer 370 protects the roof layer 360 including the organic material. In an alternative exemplary embodiment, the third insulating layer 370 may be omitted.

In an exemplary embodiment, an encapsulation layer 390 may be disposed on the third insulating layer 370. The encapsulation layer 390 covers a liquid crystal injection hole 307 through which a portion of the microcavity 305 is exposed to the outside. In such an embodiment, the encapsulation layer 390 may seal the microcavity 305 such that the liquid crystal molecules 310 in the microcavity 305 are not discharged to the outside. In an exemplary embodiment, where the encapsulation layer 390 is in contact with the liquid crystal molecules 310, the encapsulation layer 390 include a material that does not react with the liquid crystal molecules 310. In one exemplary embodiment, for example, the encapsulation layer 390 may include parylene or the like.

The encapsulation layer 390 may have a multilayer structure such as a double layer structure or a triple layer structure. In an exemplary embodiment, where the encapsulation layer 390 has the double layer structure, two layers of the double layer structure may include different materials. In an exemplary embodiment, where the encapsulation layer 390 has the triple layer structure, adjacent layer of three layers of the triple layer structure may have different materials from each other. In one exemplary embodiment, for example, the encapsulation layer 390 may include a layer including an organic insulating material and a layer including an inorganic insulating material.

In an exemplary embodiment, a polarizer (not shown) may be disposed on upper and lower surfaces of the display device. The polarizer may include a first polarizer and a second polarizer. The first polarizer may be disposed on, e.g., attached to, a lower surface of the substrate 110, and the second polarizer may be disposed on, e.g., attached to, the encapsulation layer 390.

Hereinafter, a unit region of the field generating electrode of an exemplary embodiment of the display device according to the invention will be described with reference to FIG. 6.

Figure 6:
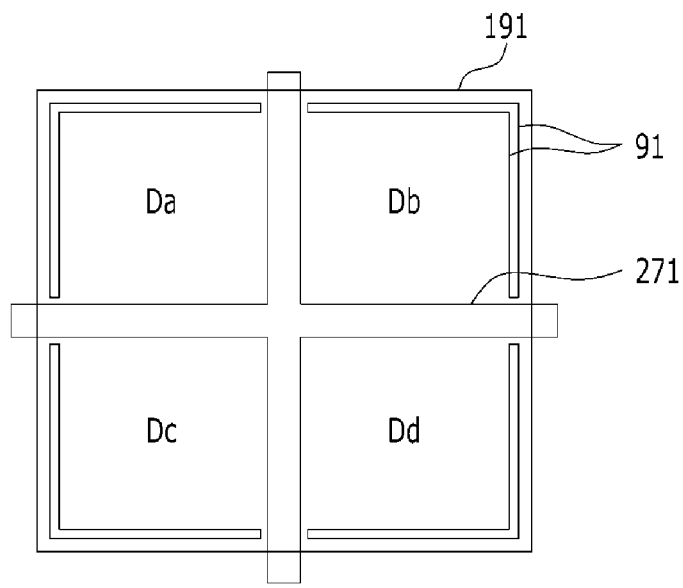
FIG. 6 is a top plan view of a unit region of a field generating electrode of an exemplary embodiment of the display device according to the invention.

FIG. 6 is a top plan view illustrating a unit region of a field generating electrode of an exemplary embodiment of the display device according to the invention.

As illustrated in FIG. 6, the unit region of the field generating electrode is defined by a portion of the pixel electrode 191 facing the cutout 271 of the common electrode 270, and a cutout 91 of the pixel electrode 191 surrounding the cutout 271 of the common electrode 270. When viewed form a top plan view, as shown in FIG. 6, the unit region defined by the cutout 271 of the common electrode 270 and the edge of the pixel electrode 191 may be divided into a plurality of sub-regions Da, Db, Dc and Dd, and the sub-regions may be substantially symmetric to each other with respect to the cutout 271 of the common electrode 270.

In such an embodiment, as described above, when viewed from a top view, the cutout 271 of the common electrode 270 may have a cross shape, and an end of the cutout 271 protrudes farther than the corresponding edge of the pixel electrode 191. In an exemplary embodiment, the width of the cutout 271 of the common electrode 270 may be in a range of about 2 micrometers (μm) to about 10 micrometers (μm).

In an exemplary embodiment, as shown in FIG. 6, the cutout 91 of the pixel electrode 191 may have a substantially quadrangle ring shape along the edge of the pixel electrode 191, and is disconnected around a portion corresponding to the end of the cutout 271 of the common electrode 270. In such an embodiment, the portion of the pixel electrode 191, at which the cutout 91 in the pixel electrode 191 is disconnected, may be a connection portion of the pixel electrode. A width of the connection portion of the pixel electrode is greater than a width of the corresponding cutout 271 of the common electrode 270.

The cutout 91 of the pixel electrode 191 may be spaced apart from the edge of the pixel electrode 191 by an interval less than or equal to about two times the cell gap of the display device. In an exemplary embodiment, the width of the cutout 91 be less than or equal to about two times the cell gap of the display device.

In an exemplary embodiment, the width of the cutout 271 having the cross shape be less than or equal to about three times the thickness of the liquid crystal layer, that is, the cell gap.

In an exemplary embodiment, the cutout may be defined on at least one of the pixel electrode and the common electrode that are the field generating electrodes. In an exemplary embodiment of the display device, as described above, the cutout having the cross shape is defined on the common electrode, but not being limited thereto. In an alternative exemplary embodiment, the cutout having the cross shape may be defined on the pixel electrode, or may be defined on all of the pixel electrode and the common electrode.

Figure 7:
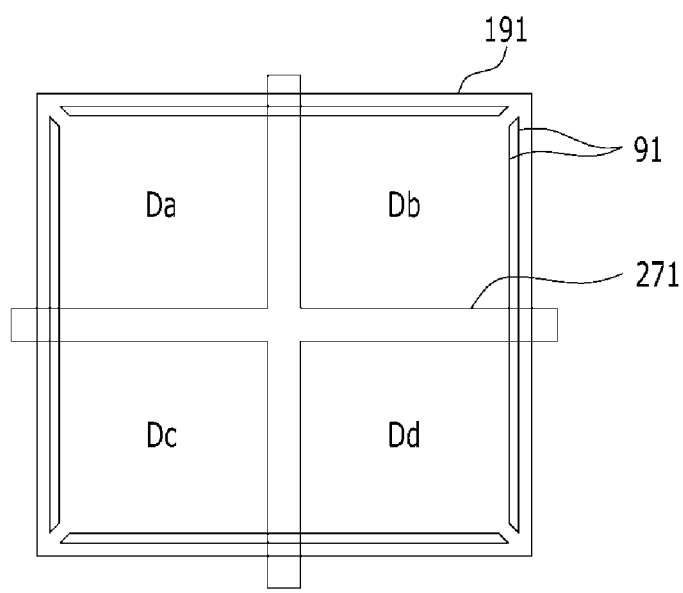
FIG. 7 is a top plan view illustrating a unit region of a field generating electrode of an alternative exemplary embodiment of the display device according to the invention.

Then, a unit region of a field generating electrode of an alternative exemplary embodiment of a display device according to the invention will be described with reference to FIG. 7. FIG. 7 is a top plan view illustrating a unit region of a field generating electrode of alternative exemplary embodiment of the display device according to the invention.

As illustrated in FIG. 7, the unit region of the field generating electrode is defined by the pixel electrode 191 facing a cutout 271 of the common electrode 270, and the cutout 91 of the pixel electrode 191 surrounding the cutout 271 of the common electrode 270. When viewed from a top view, as shown in FIG. 7, the unit region defined by the cutout 271 of the common electrode 270 and the edge of the pixel electrode 191 may be divided into a plurality of sub-regions, e.g., a first sub-region Da, a second sub-region Db, a third sub-region Dc and a fourth sub-region Dd, and the sub-regions may be substantially symmetric to each other with respect to the cutout 271 of the common electrode 270.

In an exemplary embodiment, as shown in FIG. 7, the cutout 271 of the common electrode 270 may have a cross shape, and an end of the cutout 271 protrudes farther than the corresponding edge of the pixel electrode 191. In an exemplary embodiment, the width of the cutout 271 of the common electrode 270 may be in a range of about 2 μm to about 10 μm.

In an exemplary embodiment, the cutout 91 of the pixel electrode 191 may have a substantially quadrangle ring shape along the edge of the pixel electrode 191, and is disconnected at four portions, at which the edges of the pixel electrode 191 extending in different directions meet, that is, portions adjacent to corner portions of the pixel electrode 191. In such an embodiment, the portion at which the cutout 91 in the pixel electrode 191 is disconnected is a connection portion of the pixel electrode. In such an embodiment, as shown in FIG. 7, the cutout 91 of the pixel electrode 191 partially overlaps the cutout 271 of the common electrode 270.

In an exemplary embodiment, the cutout 91 of the pixel electrode 191 may be spaced apart from the edge of the pixel electrode 191 by an interval which is less than or equal to about two times the cell gap of the display device. In an exemplary embodiment, the width of the cutout 91 be less than or equal to about two times the cell gap of the display device.

In an exemplary embodiment, the width of the cutout 271 having the cross shape may be less than or equal to about three times the thickness of the liquid crystal layer, that is, the cell gap.

In an exemplary embodiment of the display device, as described above, the cutout having the cross shape is defined on the common electrode, but not being limited thereto. In an alternative exemplary embodiment, the cutout having the cross shape may be defined on the pixel electrode, or may be defined on all of the pixel electrode and the common electrode.

Figure 8:
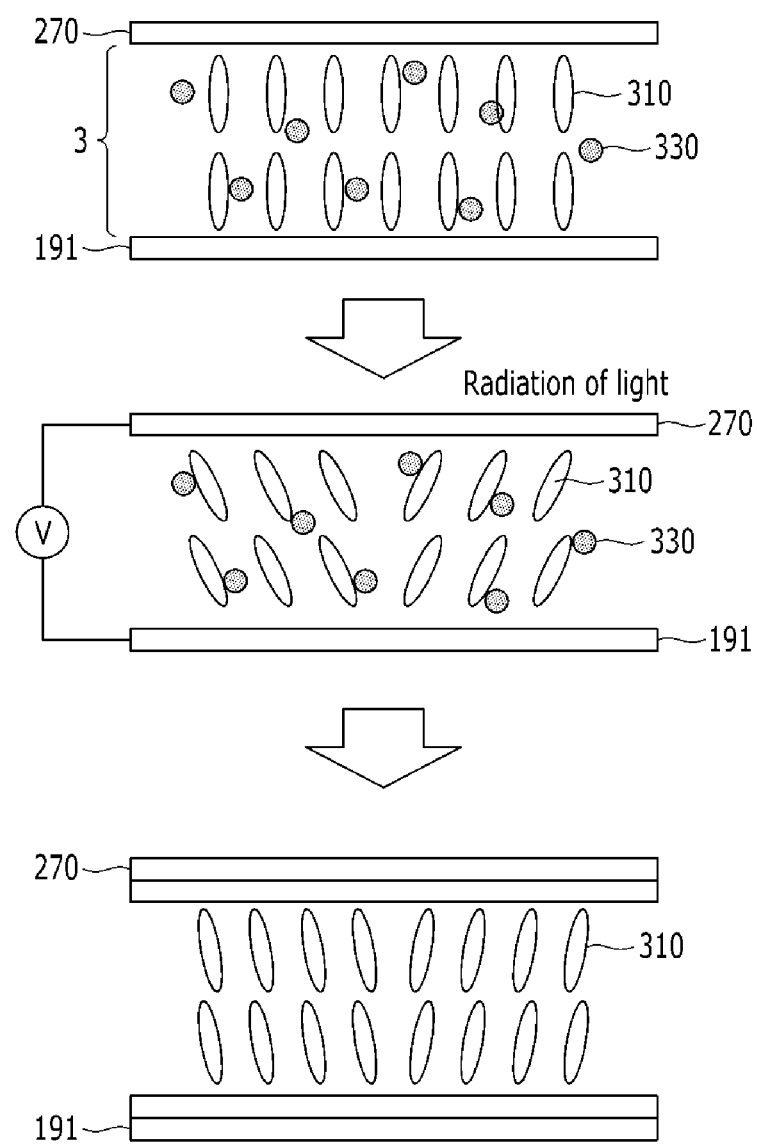
FIG. 8 is a view illustrating an exemplary embodiment of a method of providing a pretilt to liquid crystal molecules using a prepolymer polymerized by rays such as ultraviolet rays.
Figure 9A:
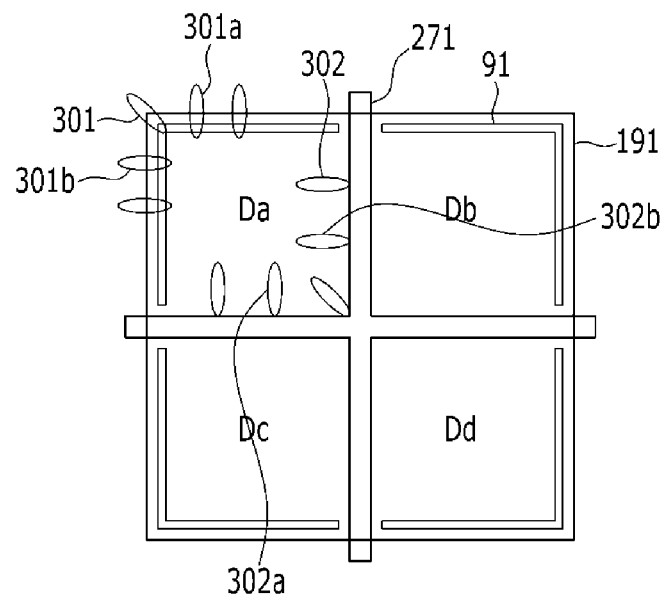
FIGS. 9A and 9B are conceptually diagrams illustrating a liquid crystal direction in a unit region of the field generating electrode of an exemplary embodiment of the display device according to the invention.
Figure 9B:
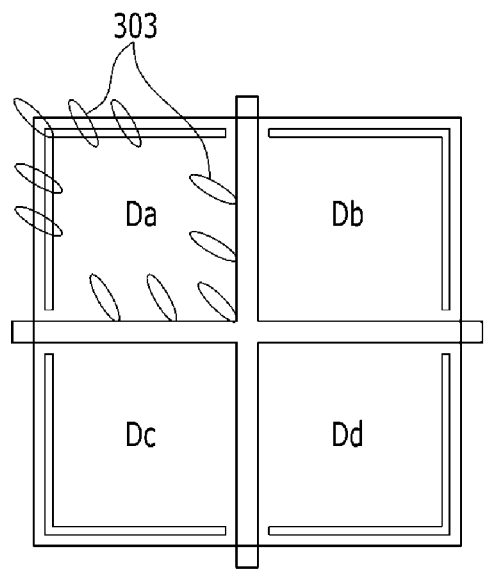

Then, an exemplary embodiment of an initial alignment method of providing a pretilt to the liquid crystal molecules 310 will be described with reference to FIGS. 8 and 9. FIG. 8 is a view illustrating an exemplary embodiment of a method of providing a pretilt to liquid crystal molecules using a prepolymer polymerized by rays such as ultraviolet rays, and FIGS. 9A and 9B are conceptual diagrams illustrating a liquid crystal direction in the unit region of the field generating electrode of an exemplary embodiment of the display device according to the invention.

In an exemplary embodiment, prepolymers 330, such as monomers that are cured by polymerization by rays such as ultraviolet rays, and liquid crystal materials are injected together through the liquid crystal injection hole 307 into the microcavity 305. In such an embodiment, the prepolymer 330 may be included in the liquid crystal layer and alignment layers 11 and 21. The prepolymer 330 may be a reactive mesogen that is polymerized by rays such as ultraviolet rays.

Next, the data voltage is applied to the first and second sub-pixel electrodes 191h and 191l, and the common voltage is applied to the common electrode 270 to generate an electric field on the liquid crystal layer between the two field generating electrodes. Then, the liquid crystal molecules 310 of the liquid crystal layer respond to the electric field to be tilted substantially parallel to a direction from four portions, at which the edges of the pixel electrode 191 extending in different directions meet toward the center portion of the cutout 271 of the common electrode 270 having the cross shape, by a fringe field by the cutout 271 of the common electrode 270 and the edge of the pixel electrode 191, and the liquid crystal molecules 310 may be tilted in four directions in the unit region of the field generating electrode.

In such an embodiment, the pretilt of the liquid crystal molecules will be described in greater detail with reference to FIGS. 9A and 9B. With reference to FIG. 9A, directors 301a and 301b of the liquid crystal molecules at the portion adjacent to the edge of the pixel electrode 191 that defines the unit region of the field generating electrode are substantially vertical to the edge of the pixel electrode 191. As shown in FIG. 9A, directors 302a and 302b of the liquid crystal molecules at the portion adjacent to the cutout 271 of the common electrode that define the unit region of the field generating electrode are substantially vertical to the edge of the cutout 271 of the common electrode 270. As described above, liquid crystal directors are firstly determined based on the fringe field generated by the edge of the pixel electrode 191 forming the unit region of the field generating electrode, the cutout 91 of the pixel electrode 191, and the cutout 271 of the common electrode, and secondly arranged in a direction that minimize deformation of adjacent liquid crystal molecules that meet each, and the secondary arrangement direction may correspond to a vector sum direction of facing directions of the directors. Accordingly, as illustrated in FIG. 9B, the liquid crystal directors 303 become substantially parallel to the direction from four portions, at which the edges of the pixel electrode 191 extending in different directions meet, toward the center portion of the cutout 271 of the common electrode 270 having the cross shape. The directors of the liquid crystal molecules 310 based on the fringe field are arranged as described above in each of the sub-regions Da, Db, Dc and Dd, and the tilt directions of the liquid crystal molecules in each unit region of the field generating electrode may have four different directions. In an exemplary embodiment, the directors of the liquid crystal molecules 310 may be arranged, inclined in a rightward and downward direction from the pixel edge toward the center portion of the cutout 271 in the first sub-region Da of each sub-region, the directors of the liquid crystal molecules 310 may be arranged, included in a leftward and downward direction from the pixel edge toward the center portion of the cutout 271 in the second sub-region Db, the directors of the liquid crystal molecules 310 may be arranged, included in a rightward and upward direction from the pixel edge toward the center portion of the cutout 271 in the third sub-region Dc, and the directors of the liquid crystal molecules 310 may be arranged, inclined in a leftward and upward direction from the pixel edge toward the center portion of the cutout 271 in the fourth sub-region Dd.

In such an embodiment, the fringe field is not formed in the region corresponding to the cutout 91, and the size of the fringe field applied to the edge of the pixel electrode 191 may be adjusted. Accordingly, deterioration of a display quality that may occur due to inclination of the liquid crystal molecules in a direction that is substantially vertical to the edge of the pixel electrode 191 may be effectively prevented by reducing an effect of the fringe field applied to the liquid crystal molecules 310 disposed to be adjacent to the edge of the pixel electrode 191 and by adjusting inclination of the liquid crystal molecules 310 disposed to be adjacent to the edge of the pixel electrode 191 in a direction that is substantially vertical to the edge of the pixel electrode 191.

Hereinafter, an exemplary embodiment of a method of manufacturing the display device according to the invention will be described with reference to FIGS. 10 to 31 and with reference again to FIG. 2.

FIGS. 10 to 31 are process cross-sectional views illustrating an exemplary embodiment of a method of manufacturing the display device according to the invention. FIGS. 10, 12, 14, 16, 18, 20, 22, 24, 26, 28 and 30 are cross-sectional views taken along a same line, and FIGS. 11, 13, 15, 17, 19, 21, 23, 25, 27, 29, and 31 are cross-sectional views taken along a same line.

Figure 10:
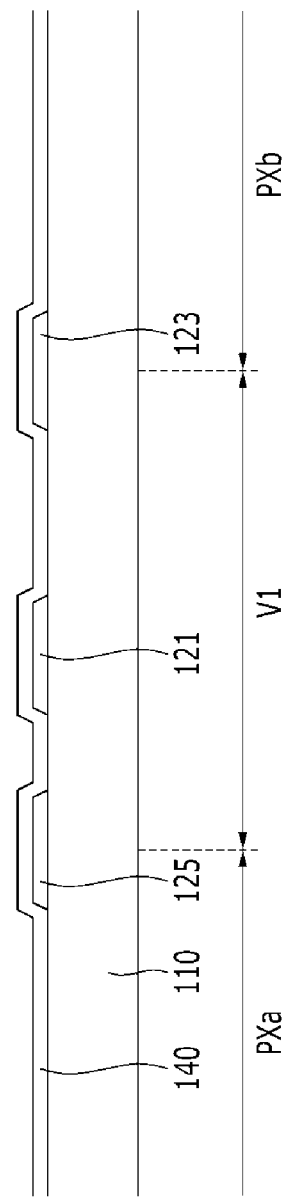
FIGS. 10 to 31 are cross-sectional views illustrating an exemplary embodiment of a method of manufacturing the display device according to the invention.
Figure 11:
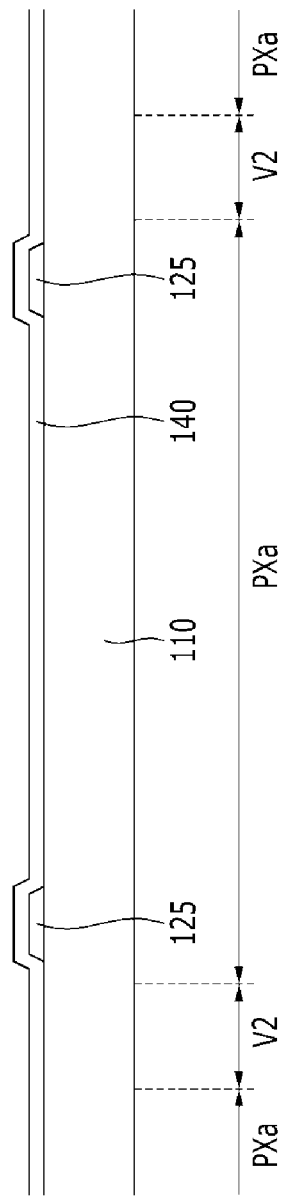

First, as illustrated in FIGS. 10 and 11, a gate line 121 and a voltage drop gate line 123 extending in a first direction are provided, e.g., formed, on a substrate 110 including glass, plastic, or the like, and a first gate electrode 124h, a second gate electrode 124l, and a third gate electrode 124c protruding from the gate line 121 are provided on the substrate 110, as shown in FIG. 2.

In such an embodiment, a storage electrode line 125 may be provided on the substrate to be spaced apart from the gate line 121, the voltage drop gate line 123, and the first to third gate electrodes 124h, 124l and 124c.

Subsequently, a gate insulating layer 140 is provided on an entire surface of the substrate 110 including the gate line 121, the voltage drop gate line 123, the first to third gate electrodes 124h, 124l and 124c, and the storage electrode line 125 using an inorganic insulating material such as silicon oxide (SiOx) or silicon nitride (SiNx), for example. In such an embodiment, the gate insulating layer 140 may have a single layer structure or a multilayer structure.

Subsequently, a semiconductor material such as amorphous silicon, polycrystalline silicon, or metal oxide, for example, is provided, e.g., deposited, on the gate insulating layer 140, and then patterned to form a first semiconductor 154h, a second semiconductor 154l and a third semiconductor 154c shown in FIG. 2. The first semiconductor 154h may be provided on the first gate electrode 124h, the second semiconductor 154l may be provided on the second gate electrode 124l, and the third semiconductor 154c may be provided on the third gate electrode 124c.

Figure 12:
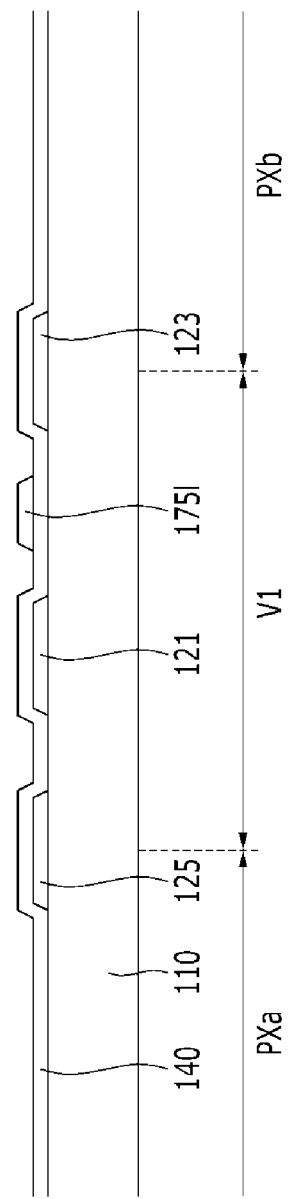
Figure 13:
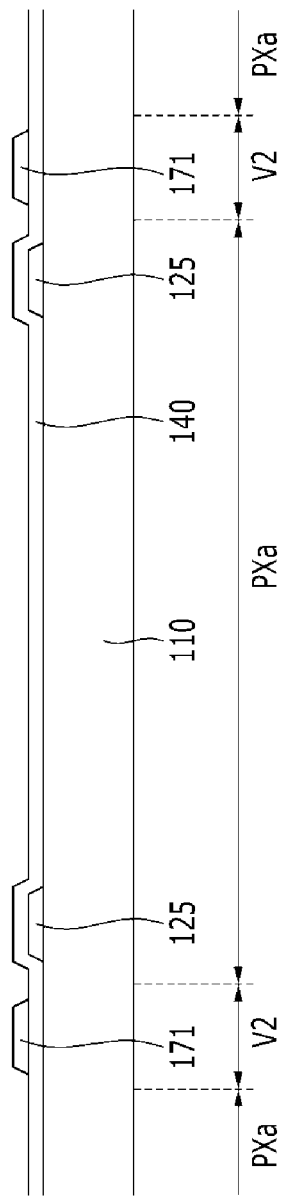

As illustrated in FIGS. 12 and 13, a data line 171 extending in a second direction is provided, e.g., formed, on the gate insulating layer 140 by depositing a metal material on the gate insulating layer 140 and then patterning the deposited metal material. The metal material may have a single layer structure or a multilayer structure.

In such an embodiment, a first source electrode 173h protruding from the data line 171 over the first gate electrode 124h, and a first drain electrode 175h spaced apart from the first source electrode 173h are provided together on the gate insulating layer 140. In such an embodiment, a second source electrode 173l connected to the first source electrode 173h, and a second drain electrode 175l spaced apart from the second source electrode 173l are provided together on the gate insulating layer 140. In such an embodiment, a third source electrode 173c extending from the second drain electrode 175l, and a third drain electrode 175c spaced apart from the third source electrode 173c are provided together on the gate insulating layer 140.

In an exemplary embodiment, the first to third semiconductors 154h, 154l and 154c, the data line 171, the first to third source electrodes 173h, 173l and 173c, and the first to third drain electrodes 175h, 175l and 175c may be provided by sequentially depositing a semiconductor material and a metal material, and then simultaneously patterning the materials. In such an embodiment, the first semiconductor 154h is provided to extend below the data line 171.

The first, second and third gate electrodes 124h, 124l and 124c, the first, second and third source electrodes 173h, 173l and 173c, the first, second and third drain electrodes 175h, 175l and 175c, and the first, second and third semiconductors 154h, 154l and 154c collectively define first, second and third thin film transistors Qh, Ql and Qc, respectively.

Figure 14:
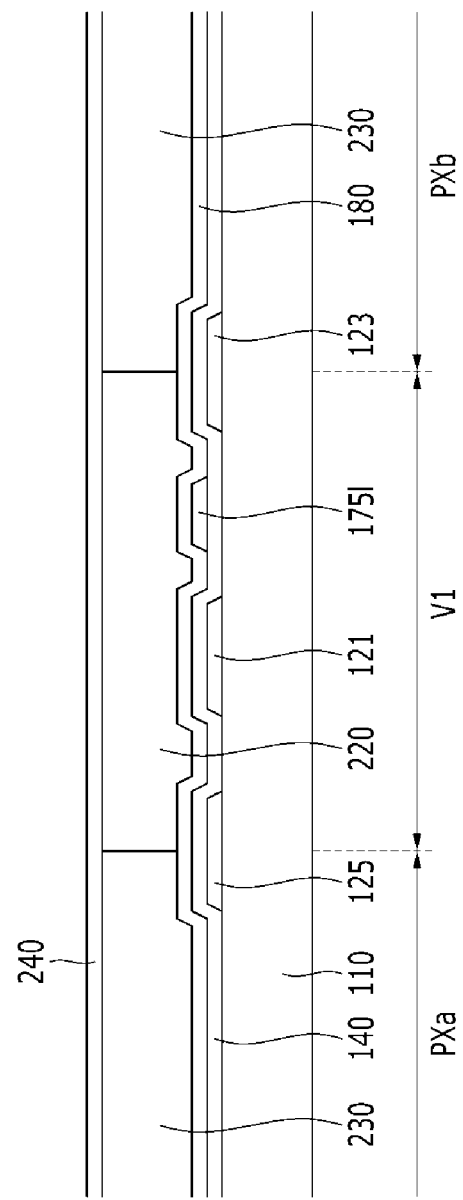
Figure 15:
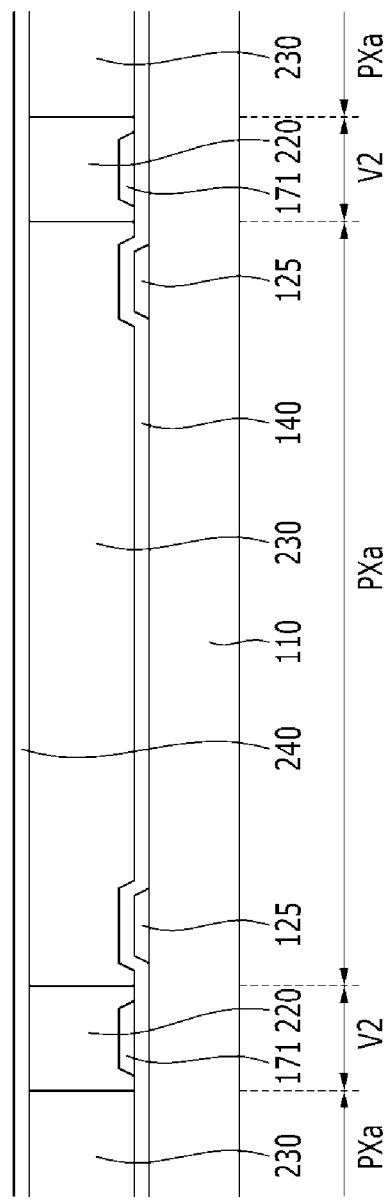

As illustrated in FIGS. 14 and 15, a passivation layer 180 is provided on the semiconductors 154h, 154l and 154c exposed between the data line 171, the first to third source electrodes 173h, 173l and 173c, the first to third drain electrodes 175h, 175l and 175c, each of the source electrodes 173h, 173l and 173c, and each of the drain electrodes 175h, 175l and 175c. The passivation layer 180 may include an organic insulating material or an inorganic insulating material, and may have a single layer structure or a multilayer structure.

Subsequently, a color filter 230 is provided in each pixel region PX on the passivation layer 180. The color filters 230 having the same color may be provided to extend in a column direction of a plurality of pixel regions PX. In an exemplary embodiment, where the color filters 230 having three colors are provided, after the color filter 230 having a first color is firstly provided, the color filter 230 having a second color may be provided by shifting a mask. In such an embodiment, after the color filter 230 having the second color is provided, the color filter having a third color may be provided by shifting the mask.

Subsequently, a light blocking member 220 is provided on a boundary portion of each pixel region PX on the passivation layer 180 and the thin film transistors.

In an exemplary embodiment, the light blocking member 220 is provided after the color filter 230 is provided, but the invention is not limited thereto. In an alternative exemplary embodiment, the color filter 230 may be provided after the light blocking member 220 is firstly provided.

Subsequently, a first insulating layer 240 including an inorganic insulating material such as silicon nitride (SiNx) and silicon oxide (SiOx), for example, is provided on the color filter 230 and the light blocking member 220.

Subsequently, as shown in FIG. 2, a first contact hole 185h that exposes a portion of the first drain electrode 175h and a second contact hole 185l that exposes a portion of the second drain electrode 175l are formed through the passivation layer 180, the light blocking member 220 and the first insulating layer 240 by etching the passivation layer 180, the light blocking member 220 and the first insulating layer 240.

Figure 16:
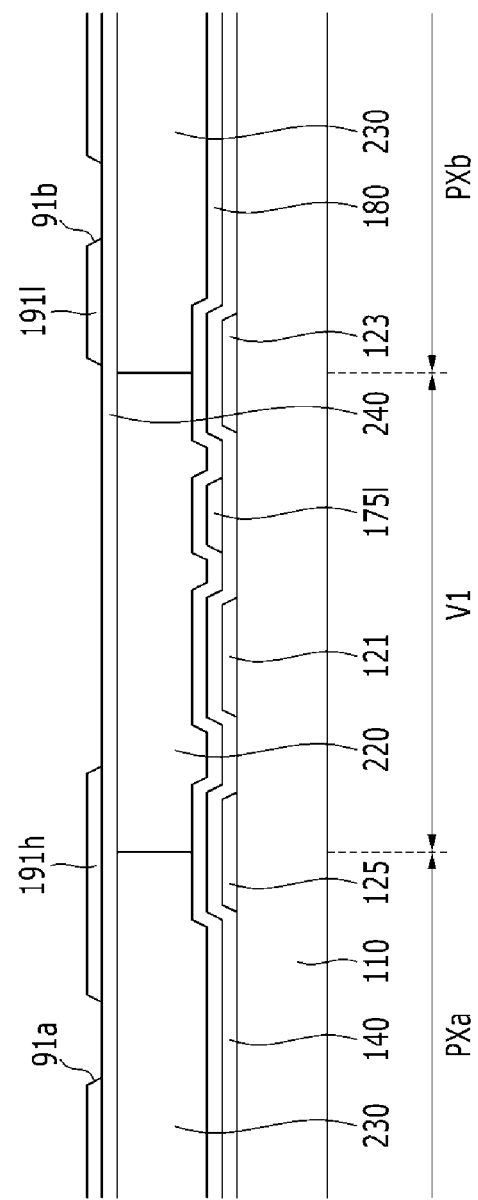
Figure 17:
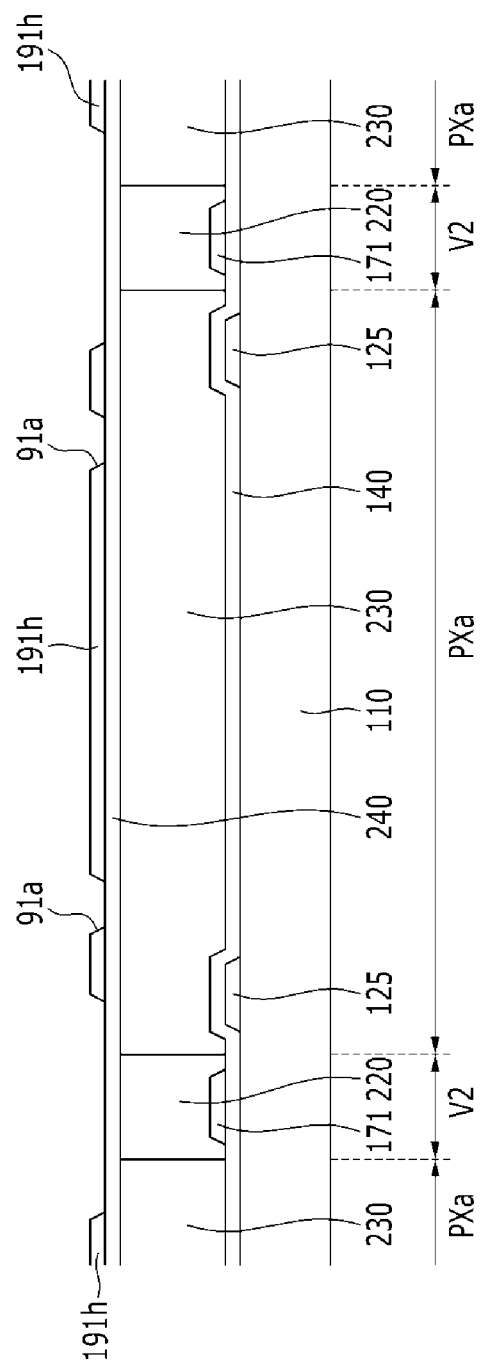

As illustrated in FIGS. 16 and 17, a first sub-pixel electrode 191h is provided in a first sub-pixel region PXa and a second sub-pixel electrode 191l is provided in a second sub-pixel region PXb by depositing a transparent metal material such as ITO and IZO on the first insulating layer 240, and then patterning the transparent metal material. The first sub-pixel electrode 191h is provided to be connected through the first contact hole 185h to the first drain electrode 175h, and the second sub-pixel electrode 191l is provided to be connected through the second contact hole 185l to the second drain electrode 175l.

In an exemplary embodiment, cutouts 91a and 91b are formed in the first sub-pixel electrode 191h and the second sub-pixel electrode 191l, respectively. The cutouts 91a and 91b are formed along an edge to be adjacent to at least a portion of edges of the first sub-pixel electrode 191h and the second sub-pixel electrode 191l.

Figure 18:
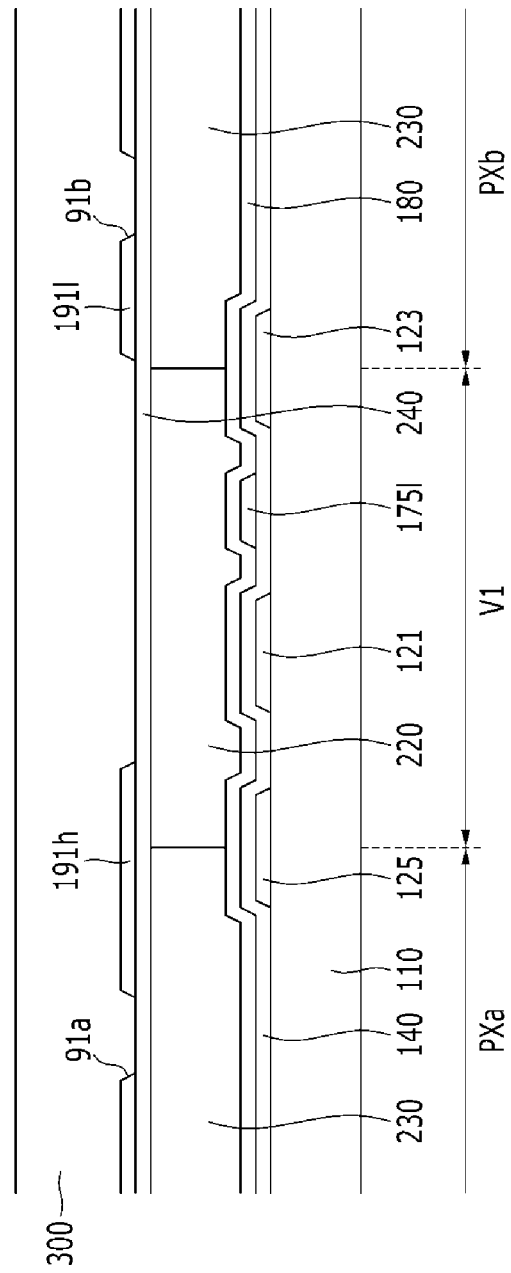
Figure 19:
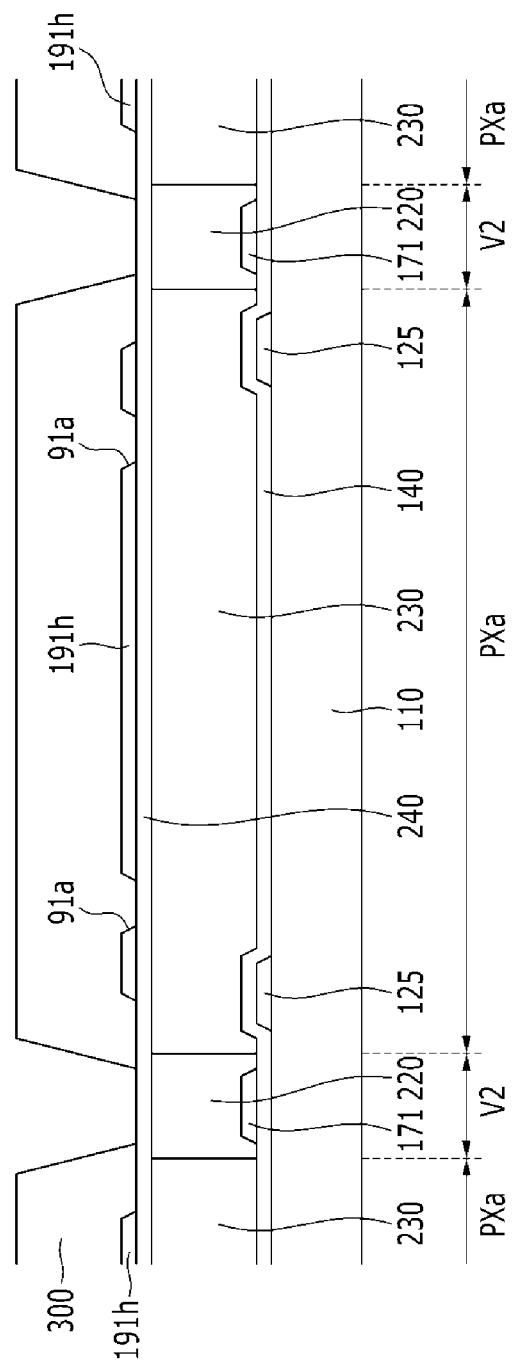

As illustrated in FIGS. 18 and 19, a photosensitive organic material is applied on the pixel electrode 191, and a sacrificial layer 300 is formed through a photo process. In an exemplary embodiment, the sacrificial layer 300 includes a positive photosensitive material.

In an exemplary embodiment, the sacrificial layers 300 are provided to be connected along the pixel columns. In such an embodiment, the sacrificial layer 300 is provided to cover each pixel region PX and to cover a first valley V1 positioned between the first sub-pixel region PXa and the second sub-pixel region PXb.

Figure 20:
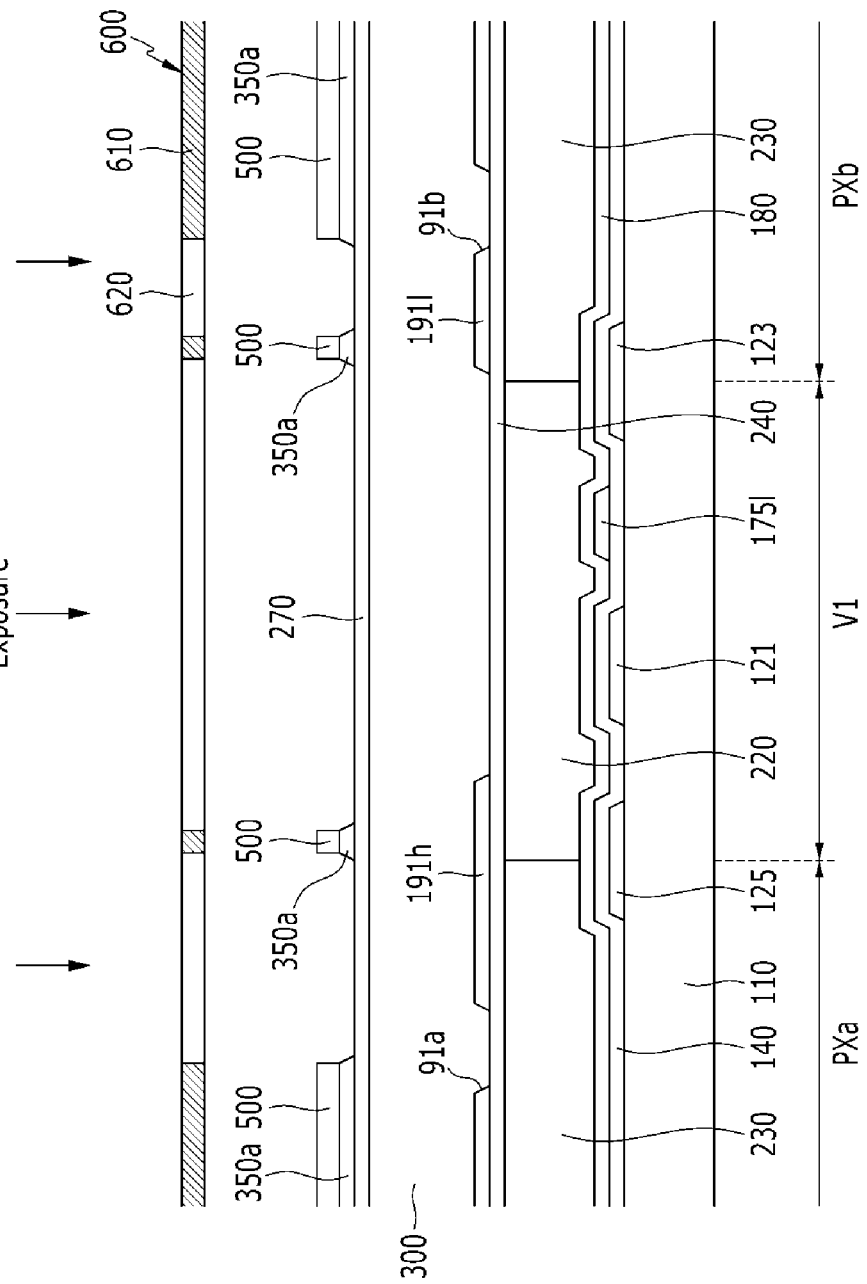
Figure 21:
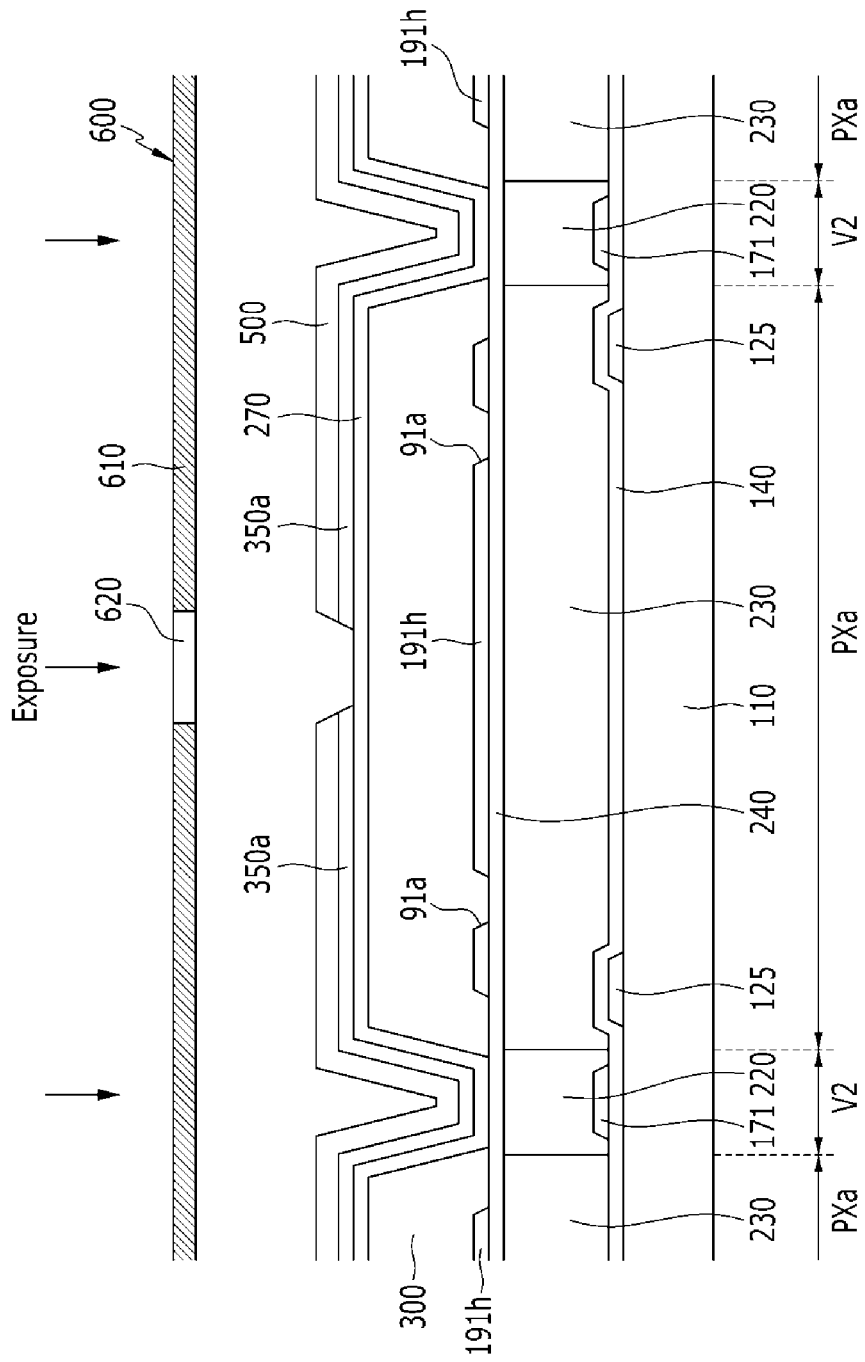

As illustrated in FIGS. 20 and 21, a transparent metal material such as ITO and IZO, for example, is deposited on the sacrificial layer 300 to provide a common electrode 270.

Subsequently, a second lower insulating layer 350a including an inorganic insulating material such as silicon oxide or silicon nitride, for example, is provided on the common electrode 270.

Subsequently, a photosensitive film pattern 500 is provided by applying a photosensitive film on the second lower insulating layer 350a, disposing a mask 600 to correspond to an upper portion of the substrate 110, and exposing and developing the photosensitive film. The mask includes an opaque portion 610 which blocks light and a transmission portion 620 which allows light to pass therethrough.

Subsequently, the second lower insulating layer 350a is patterned using the photosensitive film pattern 500.

Figure 22:
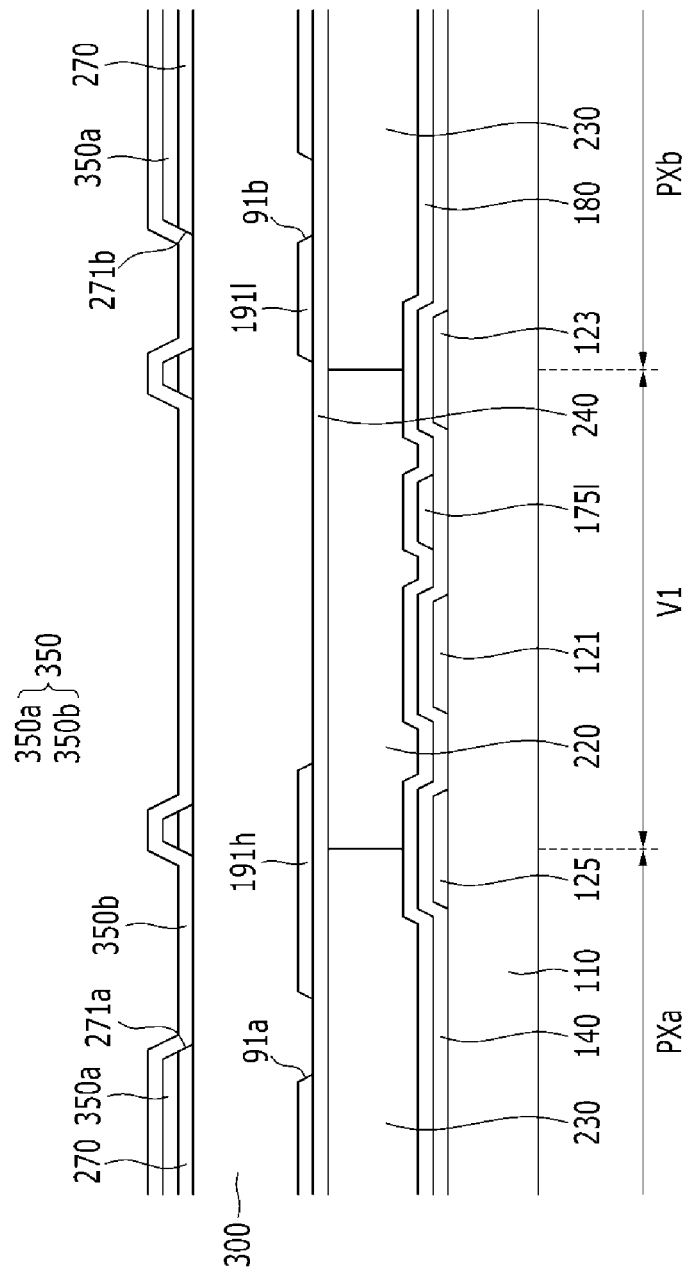
Figure 23:
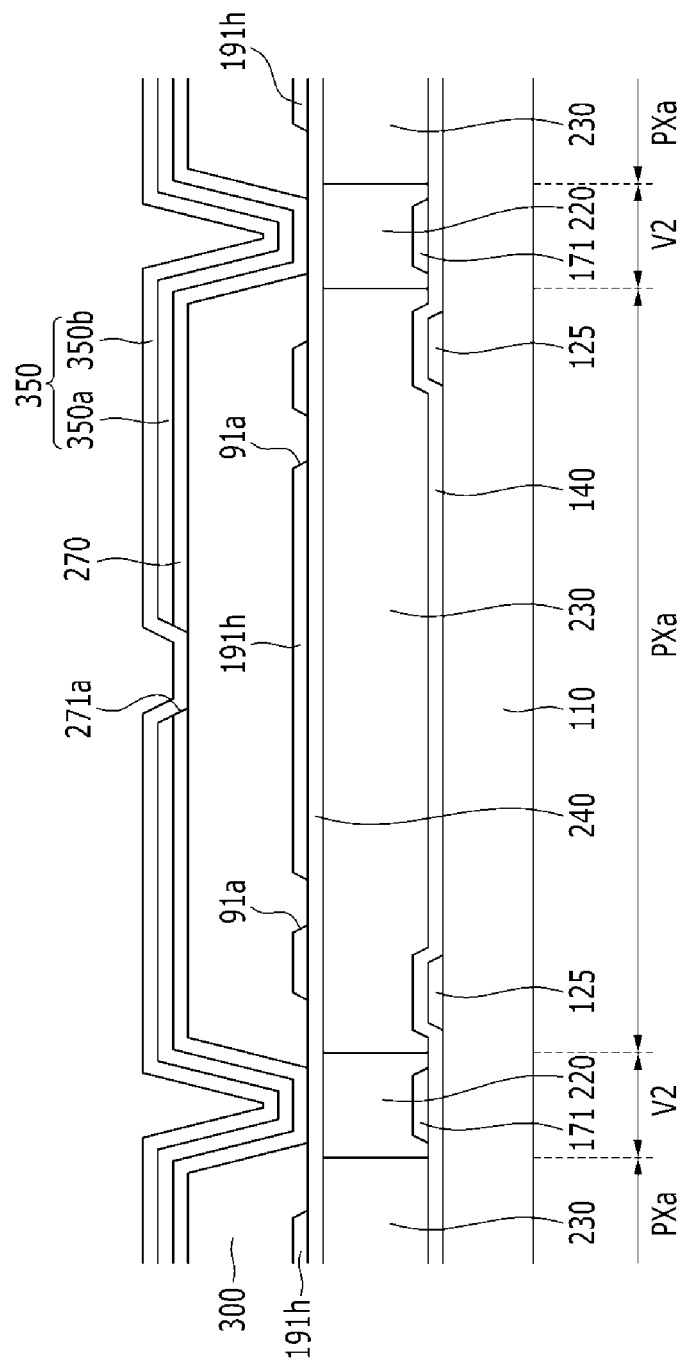

As illustrated in FIGS. 22 and 23, the photosensitive film pattern 500 is removed. The entire surface of the photosensitive film pattern 500 may be removed by supplying a stripper solution to the photosensitive film pattern 500.

When a process of removing the photosensitive film pattern 500 is performed, since the sacrificial layer 300 is not exposed to the outside, damage of the sacrificial layer 300 by the stripper solution is effectively prevented.

Subsequently, the cutouts 271a and 271b of the common electrode 270 are formed by patterning the common electrode 270 using the second lower insulating layer 350a as the mask. Accordingly, the second lower insulating layer 350a is provided to have substantially the same pattern as the common electrode 270. In an exemplary embodiment, the second lower insulating layer 350a is provided on the common electrode 270, but is not provided on the cutouts 271a and 271b. In such an embodiment, the second lower insulating layer 350a is provided on a portion of the common electrode 270 other than the cutouts 271a and 271b.

The common electrode 270 is provided to substantially cover each pixel region PX, and to cover a second valley V2 positioned between adjacent pixel regions PX. In an exemplary embodiment, the cutouts 271a and 271b include a first cutout 271a formed in the first sub-pixel region PXa and a second cutout 271b formed in the second sub-pixel region PXb. In such an embodiment, the first cutout 271a may overlap the first sub-pixel electrode 191h, and the second cutout 271b may overlap the second sub-pixel electrode 191l.

When viewed from a top view, the first cutout 271a and the second cutout 271b may have a cross shape, ends of the first cutout 271a and the second cutout 271b protrude farther than edges of the first sub-pixel electrode 191h and the second sub-pixel electrode 191l, respectively. However, the shapes of the cutouts 271a and 271b formed in the common electrode 270 are not limited to the shape descried above, and the cutouts may have various shapes.

Subsequently, a second upper insulating layer 350b including an inorganic insulating material such as silicon oxide or silicon nitride is provided on the second lower insulating layer 350a. The second upper insulating layer 350b may be provided overlapping substantially an entire upper surface of the substrate 110.

The second lower insulating layer 350a and the second upper insulating layer 350b are provided, e.g., laminated, on the common electrode 270, and only the second upper insulating layer 350b is disposed on the cutouts 271a and 271b.

Figure 24:
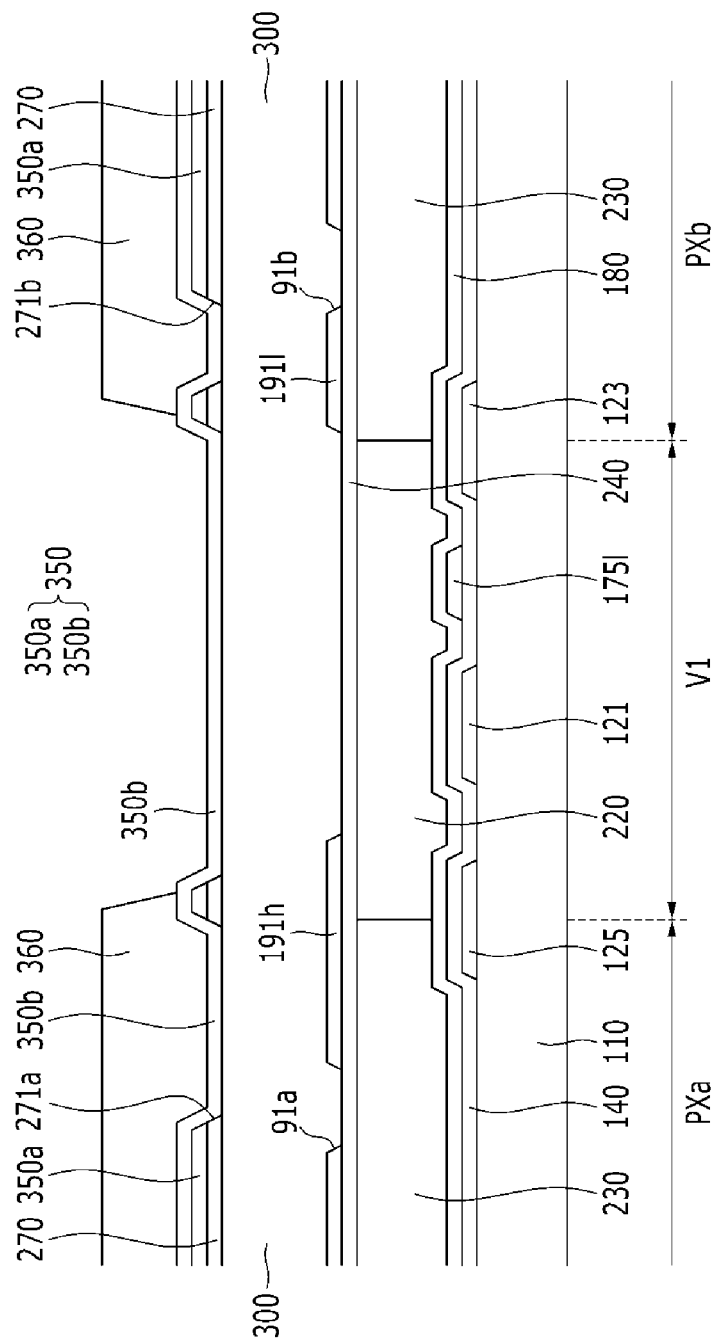
Figure 25:
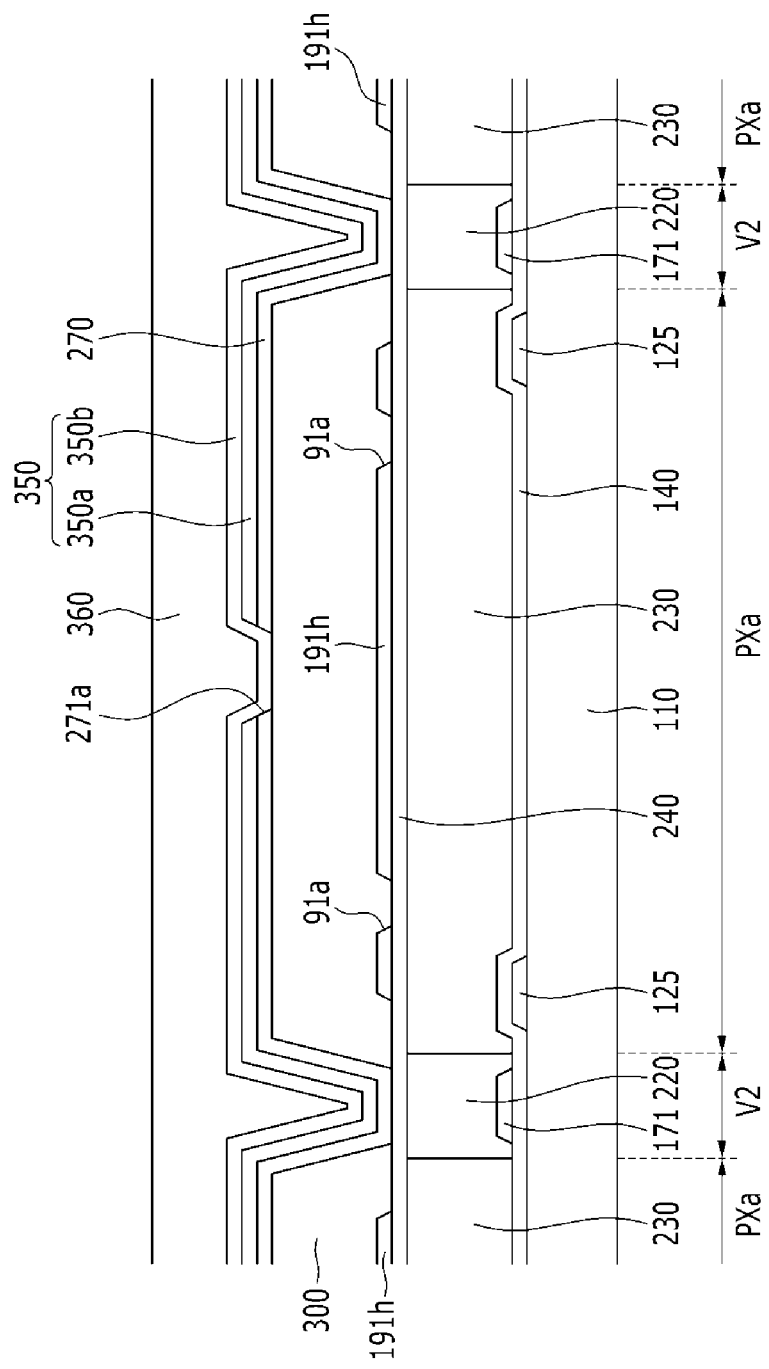

As illustrated in FIGS. 24 and 25, a roof layer 360 including an organic material is provided on the second insulating layer 350. In an exemplary embodiment, the roof layer 360 may be provided on the second upper insulating layer 350b, and the roof layer 360 positioned in the first valley V1 may be removed by patterning the roof layer 360.

Figure 26:
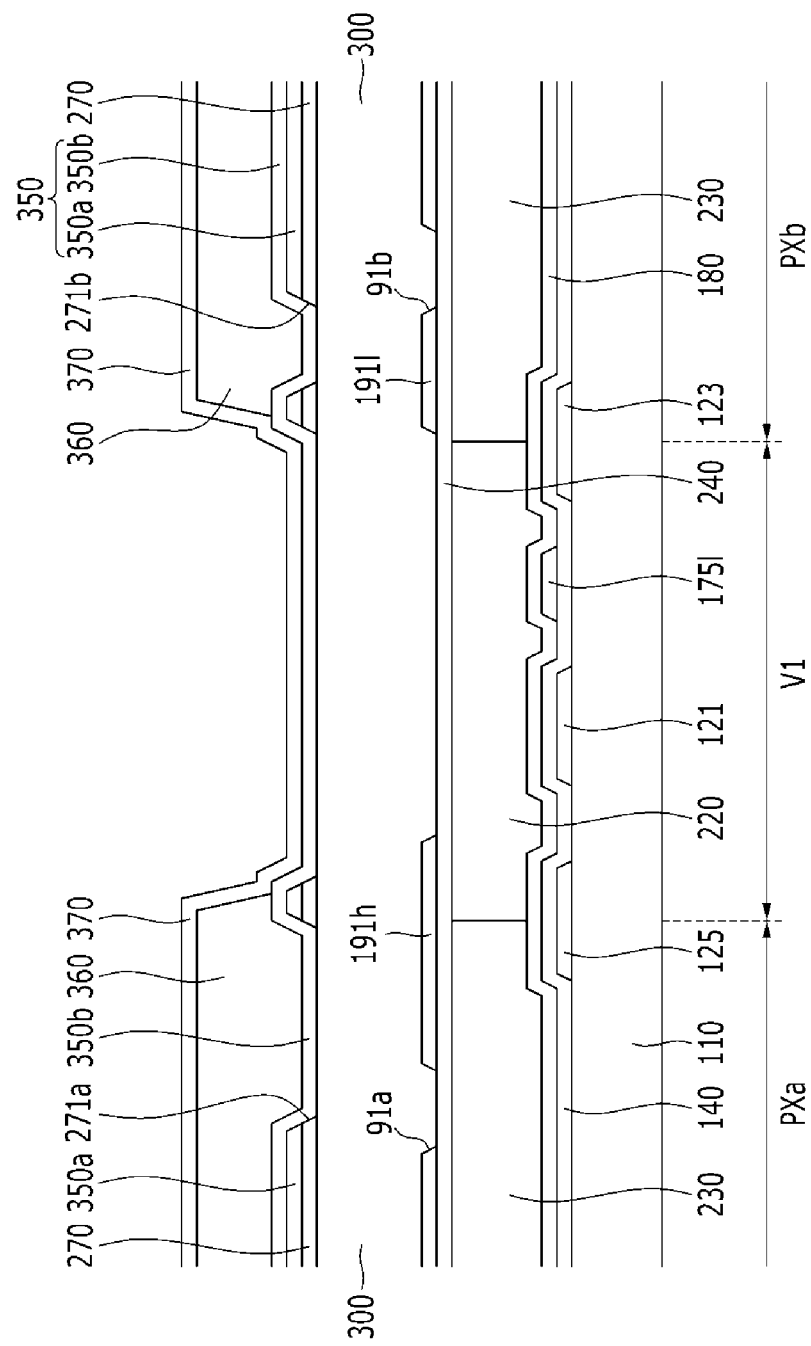
Figure 27:
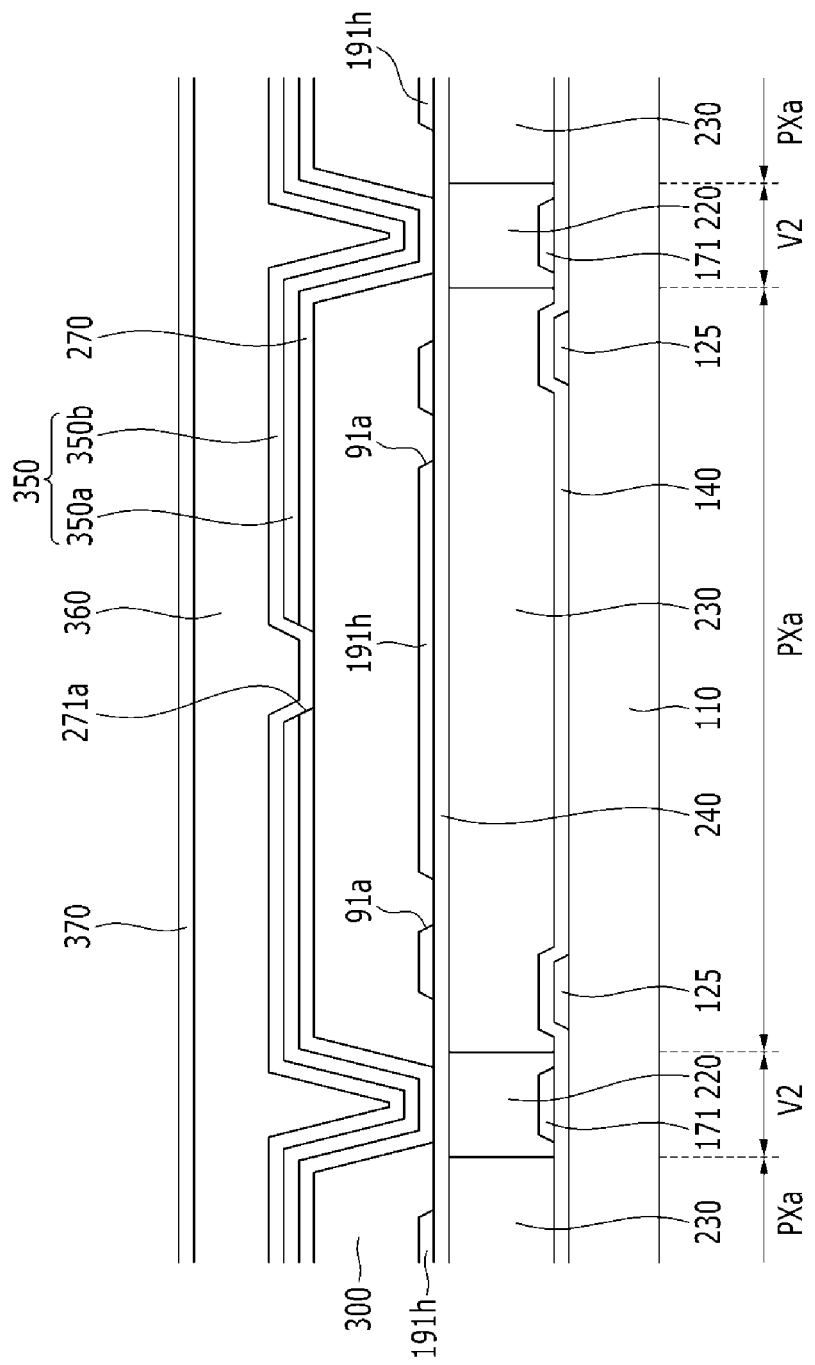

As illustrated in FIGS. 26 and 27, a third insulating layer 370 including an inorganic insulating material such as silicon nitride (SiNx) and silicon oxide (SiOx), for example, may be provided on the roof layer 360. The third insulating layer 370 may be provided on the patterned roof layer 360 to protect the roof layer 360 by covering the lateral surface of the roof layer 360.

Figure 28:
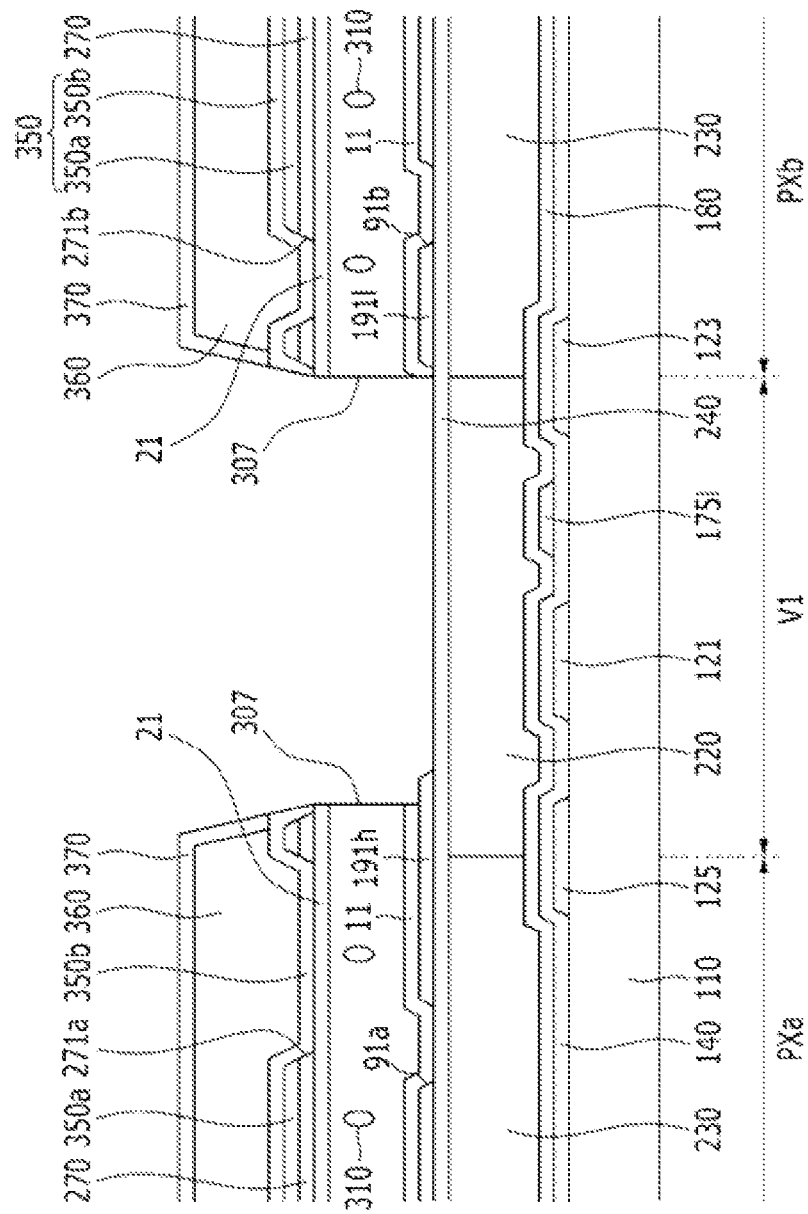
Figure 29:
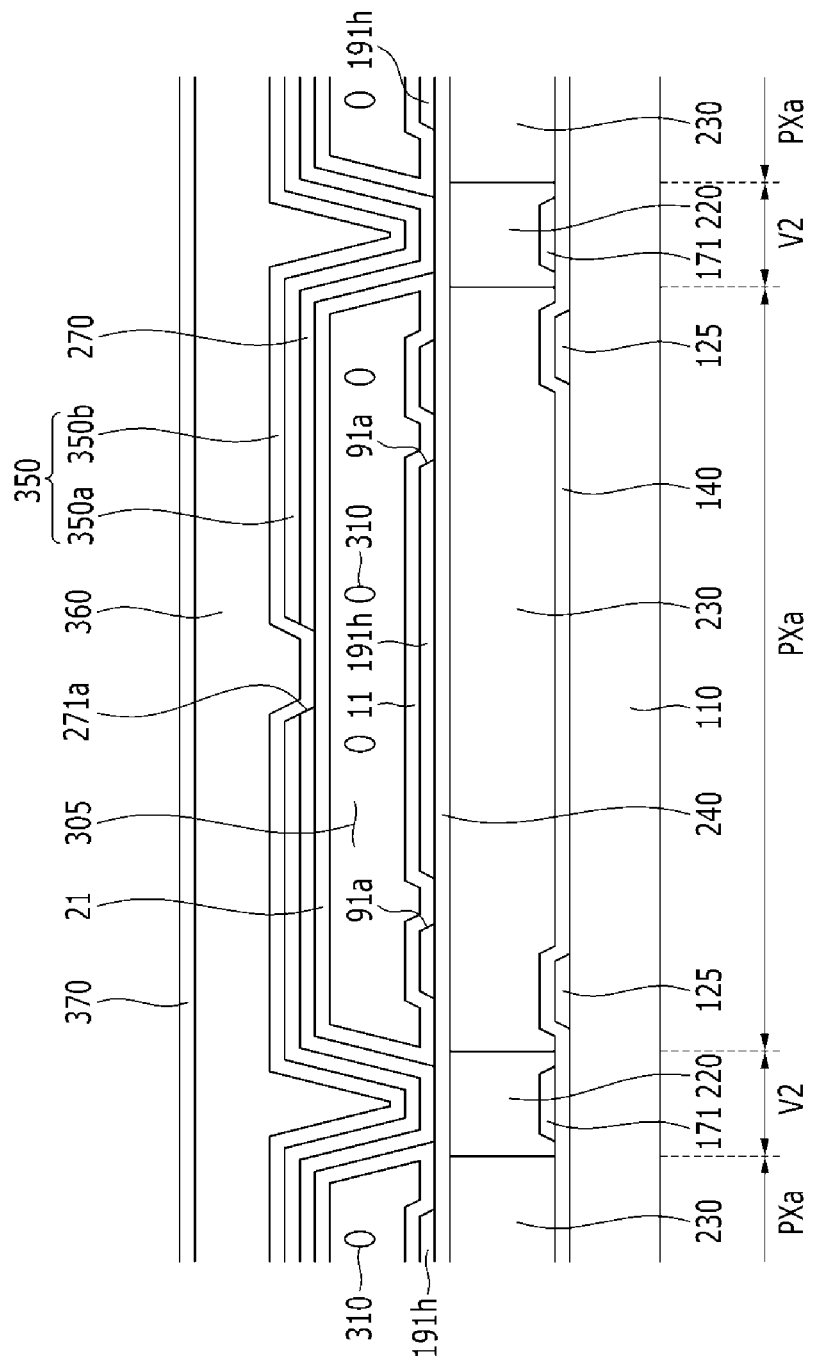

As shown in FIGS. 28 and 29, the third insulating layer 370 and the second upper insulating layer 350b positioned in the first valley V1 are removed by patterning the third insulating layer 370 and the second upper insulating layer 350b. The patterned second upper insulating layer 350b remains on the common electrode 270 including the cutouts 271a and 271b.

The sacrificial layer 300 positioned in the first valley V1 is exposed by patterning the third insulating layer 370 and the second upper insulating layer 350b.

An oxygen plasma is provided on the substrate 110 in which the sacrificial layer 300 is exposed to perform ashing, or a developing solution is provided to remove an entire surface of the sacrificial layer 300 such that the sacrificial layer 300 is removed, and a microcavity 305 is thereby formed at a position in which the sacrificial layer 300 was positioned.

The pixel electrode 191 and the common electrode 270 are spaced apart from each other with the microcavity 305 interposed therebetween, and the pixel electrode 191 and the roof layer 360 are spaced apart from each other with the microcavity 305 interposed therebetween. The common electrode 270 and the roof layer 360 cover an upper surface and both lateral surfaces of the microcavity 305.

In an exemplary embodiment, the microcavity 305 is exposed to the outside through a portion in which the roof layer 360 and the common electrode 270 are removed, which is referred to as the liquid crystal injection hole 307. The liquid crystal injection hole 307 is formed along the first valley V1. In an alternative exemplary embodiment, the liquid crystal injection hole 307 may be formed along the second valley V2.

Subsequently, the roof layer 360 is cured by heating the substrate 110 such that the shape of the microcavity 305 is effectively maintained by the roof layer 360.

Subsequently, an aligning agent including an alignment material is dropped on the substrate 110 by a spin coating manner or an inkjet manner, and the aligning agent is injected through the liquid crystal injection hole 307 into the microcavity 305. In an exemplary embodiment, a curing process is performed after the aligning agent is injected into the microcavity 305, a solution component is vaporized, and the alignment material remains on an inner wall surface of the microcavity 305.

In such an embodiment, a first alignment layer 11 may be provided on the pixel electrode 191, and a second alignment layer 21 may be provided under the common electrode 270. The first alignment layer 11 and the second alignment layer 21 are provided to face each other with the microcavity 305 interposed therebetween, and to be connected to each other at the edge of the pixel region PX.

In an exemplary embodiment, the first and second alignment layers 11 and 21 may be aligned in a direction that is substantially vertical to the first substrate 110 except a portion thereof on the lateral surface of the microcavity 305. Alignment may be performed in a direction that is substantially horizontal to the substrate 110 using a process of radiating ultraviolet rays on the first and second alignment layers 11 and 21.

Subsequently, in an exemplary embodiment, the liquid crystal material formed of liquid crystal molecules 310 may be provided, e.g., dropped, on the substrate 110 using an inkjet method or a dispensing method, such that the liquid crystal material is injected through the liquid crystal injection hole 307 into the microcavity 305. In an exemplary embodiment, the liquid crystal material may be dropped onto the liquid crystal injection hole 307 formed along an odd numbered first valley V1, and may not be dropped onto the liquid crystal injection hole 307 formed along an even numbered first valley V1. In an alternative exemplary embodiment, the liquid crystal material may be dropped onto the liquid crystal injection hole 307 formed along the even numbered first valley V1, and may not be dropped onto the liquid crystal injection hole 307 formed along the odd numbered first valley V1.

In an exemplary embodiment, where the liquid crystal material is dropped onto the liquid crystal injection hole 307 formed along the odd numbered first valley V1, the liquid crystal material enters the microcavity 305 through the liquid crystal injection hole 307 by capillary force. In such an embodiment, air in the microcavity 305 is discharged through the liquid crystal injection hole 307 formed along the even numbered first valley V1, and thus the liquid crystal material is effectively provided in the microcavity 305.

In another alternative exemplary embodiment, the liquid crystal material may be dropped onto all liquid crystal injection holes 307. In such an embodiment, the liquid crystal material may be dropped onto the liquid crystal injection hole 307 formed along the odd numbered first valley V1 and the liquid crystal injection hole 307 formed along the even numbered first valley V1.

Figure 30:
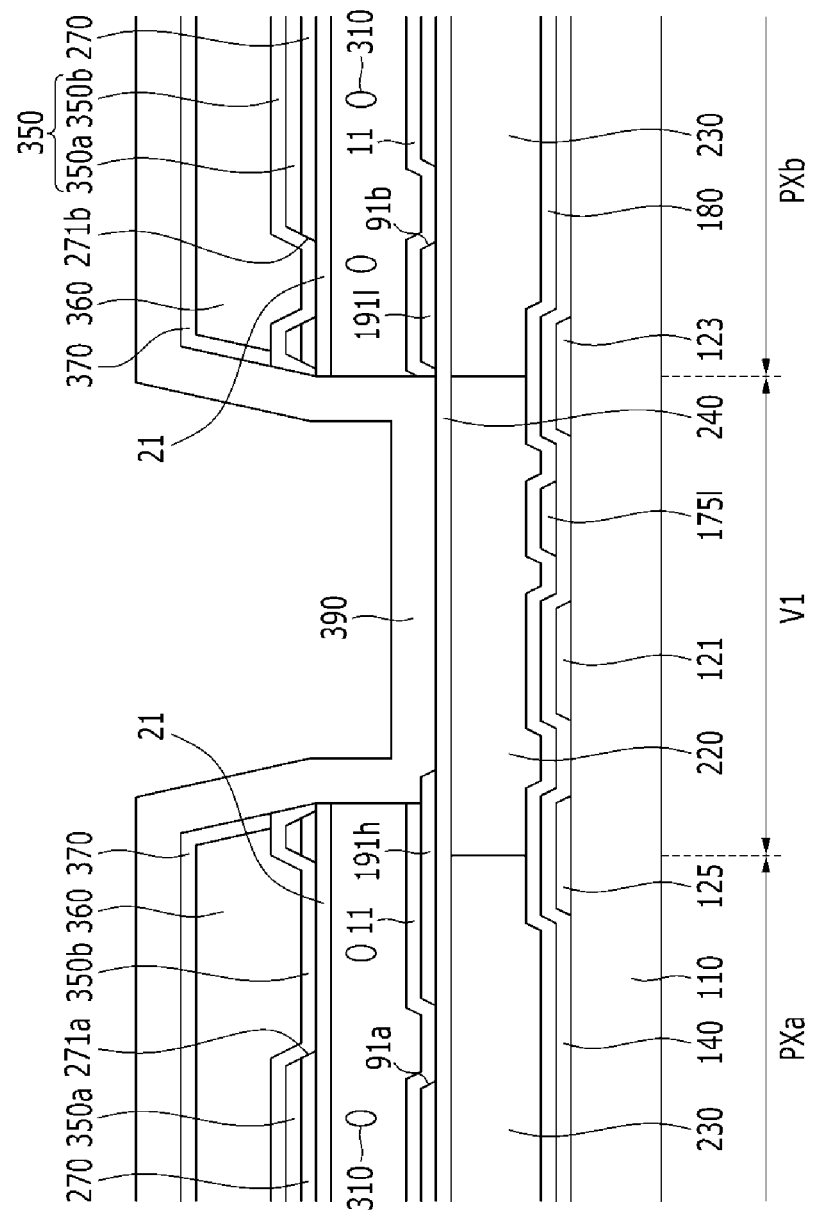
Figure 31:
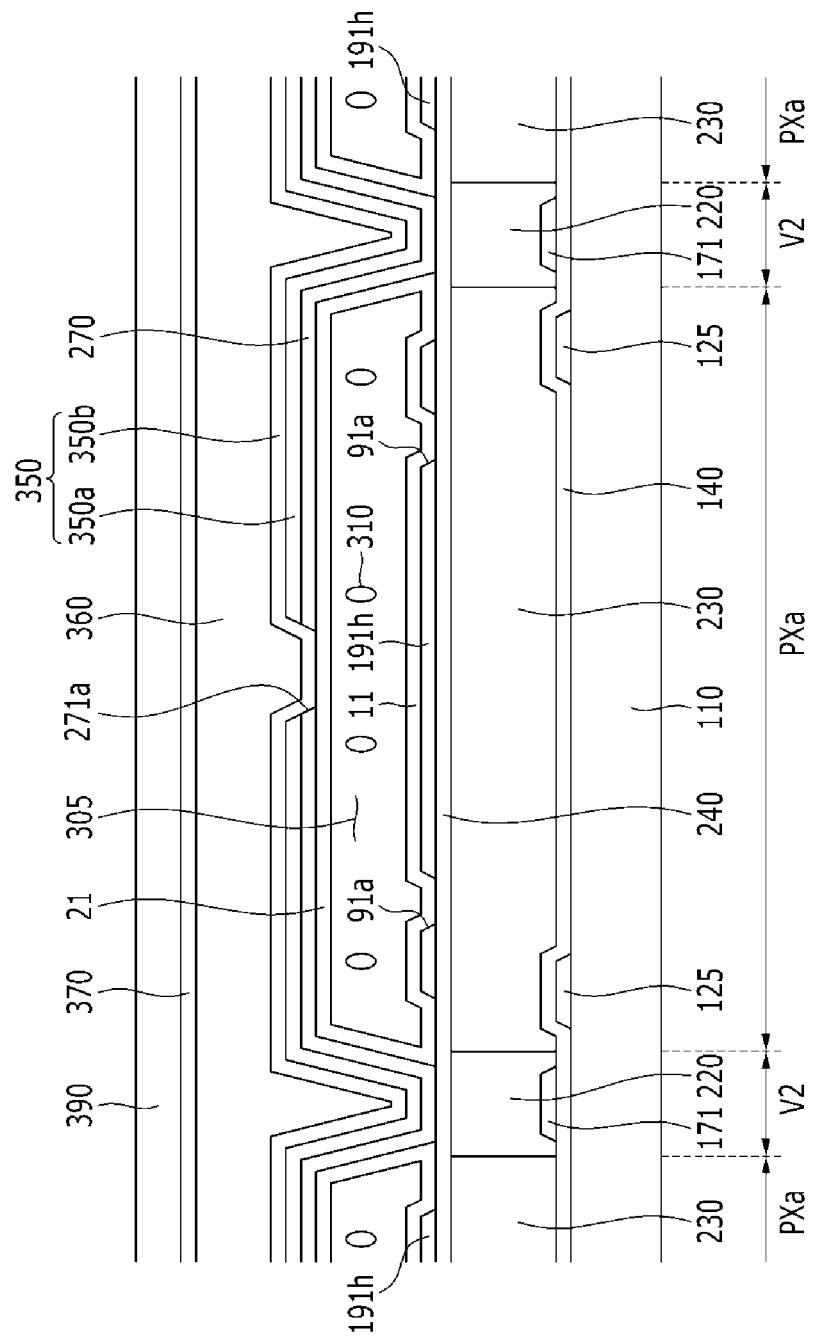

As illustrated in FIGS. 30 and 31, an encapsulation layer 390 is provided on the third insulating layer 370 by depositing a material that does not react with the liquid crystal molecule 310. The encapsulation layer 390 may be provided to cover the liquid crystal injection hole 307 through which the microcavity 305 is exposed to the outside, thus sealing the microcavity 305.

Subsequently, a polarizer (not shown) may be further provided on, e.g., attached to, upper and lower surfaces of the display device. In an exemplary embodiment, the polarizer may include a first polarizer and a second polarizer. In such an embodiment, the first polarizer may be attached to a lower surface of the substrate 110, and the second polarizer may be attached to the encapsulation layer 390.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a substrate;
a thin film transistor disposed on the substrate;
a pixel electrode connected to the thin film transistor;
a common electrode disposed opposite to the pixel electrode and spaced apart from the pixel electrode, wherein a microcavity is defined between the common electrode and the pixel electrode, and a cutout is defined in the common electrode;
a lower insulating layer disposed on the common electrode;
an upper insulating layer disposed on the lower insulating layer;
a roof layer disposed on the insulating layer, wherein a liquid crystal injection hole is formed through the common electrode and the roof layer such that the common electrode and the roof layer expose a portion of the microcavity,
a liquid crystal layer disposed in the microcavity; and
an encapsulation layer disposed on the roof layer, wherein the encapsulation layer covers the liquid crystal injection hole, and seals the microcavity,
wherein the lower insulating layer has substantially the same pattern as the common electrode.

2. The display device of claim 1, wherein
the upper insulating layer is disposed on the lower insulating layer and the cutout of the common electrode.

3. The display device of claim 2, wherein
the lower insulating layer and the upper insulating layer comprise a same material as each other.

4. The display device of claim 1, wherein
the insulating layer comprises silicon nitride or silicon oxide.

5. The display device of claim 1, further comprising:
a gate line disposed on the substrate; and
a data line disposed on the substrate crossing the gate line,
wherein a plurality of pixel regions are defined on the substrate,
a pixel region of the pixel regions comprises a first sub-pixel region and a second sub-pixel region spaced apart from each other with the gate line interposed therebetween,
the pixel electrode comprises a first sub-pixel electrode disposed in the first sub-pixel region, and a second sub-pixel electrode disposed in the second sub-pixel region, and
the common electrode and the roof layer cover a lateral surface of the microcavity at opposing edges of the pixel region.

6. The display device of claim 5, wherein
the common electrode and the roof layer cover the lateral surface of the microcavity at an edge of the pixel region which is substantially parallel to the data line, and
the liquid crystal injection hole is defined between the first sub-pixel region and the second sub-pixel region.

7. A method of manufacturing a display device, the method comprising:
providing a thin film transistor on a substrate;
providing a pixel electrode connected to the thin film transistor;
providing a sacrificial layer on the pixel electrode;
providing a common electrode on the sacrificial layer;
providing the lower insulating layer on the common electrode;
applying a photosensitive film on the lower insulating layer;
exposing and developing the photosensitive film to form a photosensitive film pattern;
patterning the lower insulating layer using the photosensitive film pattern;
removing the photosensitive film pattern;

patterning the common electrode using the patterned lower insulating layer as a mask to form a cutout of the common electrode after removing the photosensitive film pattern;

providing a roof layer on the lower insulating layer;

patterning the roof layer to expose a portion of the sacrificial layer, thus providing a liquid crystal injection hole;

removing the sacrificial layer to form a microcavity between the pixel electrode and the common electrode;

injecting a liquid crystal material through the liquid crystal injection hole into the microcavity to provide a liquid crystal layer; and providing an encapsulation layer on the roof layer to seal the microcavity.

8. The method of manufacturing a display device of claim 7, further comprising:

providing an upper insulating layer on the patterned lower insulating layer after patterning the common electrode, wherein the upper insulating layer is provided between the roof layer and the lower insulating layer.

9. The method of manufacturing a display device of claim 7, wherein the removing the photosensitive film pattern comprises using a stripper.

10. The method of manufacturing a display device of claim 8, wherein the lower insulating layer is provided on a portion of the common electrode and exposes the cutout of the common electrode.

11. The method of manufacturing a display device of claim 10, wherein the upper insulating layer is provided on the lower insulating layer and the cutout of the common electrode.

12. The method of manufacturing a display device of claim 8, wherein the lower insulating layer and the upper insulating layer comprise a same material as each other.

13. The method of manufacturing a display device of claim 8, wherein the lower insulating layer and the upper insulating layer comprise silicon nitride or silicon oxide.

14. The method of manufacturing a display device of claim 7, wherein a plurality of pixel regions is defined on the substrate, and the common electrode and the roof layer cover a lateral surface of the microcavity at opposing edges of a pixel region of the pixel regions.

* * * * *